US007523137B2

United States Patent
Kass et al.

(10) Patent No.: US 7,523,137 B2
(45) Date of Patent: Apr. 21, 2009

(54) MODEL-DRIVEN EVENT DETECTION, IMPLICATION, AND REPORTING SYSTEM

(75) Inventors: Alex Kass, Palo Alto, CA (US); Christopher Cowell-Shah, San Francisco, CA (US); Neil Sheth, San Francisco, CA (US); Lucian P Hughes, Half Moon Bay, CA (US)

(73) Assignee: Accenture Global Services GmbH (CH)

( * ) Notice: Subject to any disclaimer, the term of this patent is extended or adjusted under 35 U.S.C. 154(b) by 276 days.

(21) Appl. No.: 11/387,173

(22) Filed: Mar. 22, 2006

(65) Prior Publication Data

US 2006/0230071 A1 Oct. 12, 2006

Related U.S. Application Data

(60) Provisional application No. 60/669,850, filed on Apr. 8, 2005.

(51) Int. Cl.
*G06F 17/00* (2006.01)
(52) U.S. Cl. .................................. 707/104.1; 707/101
(58) Field of Classification Search ................ 707/1–10, 707/100–104
See application file for complete search history.

(56) References Cited

U.S. PATENT DOCUMENTS 6,173,284 B1 1/2001 Brown 7,203,693 B2* 4/2007 Carlbom et al. ............. 707/102
2003/0033318 A1* 2/2003 Carlbom et al. ............. 707/102

OTHER PUBLICATIONS

NLTK-Lite: Efficient Scripting for Natural Language Processing. Steven Bird. Proceedings of the 4th International Conference on Natural Language Processing (ICON). pp. 11-18, Kanpur, India. New Delhi: Allied Publishers. Dec. 2005.
NLTK: The Natural Language Toolkit. Steven Bird and Edward Loper. Proceedings of the ACL demonstration session, Barcelona, Association for Computational Linguistics, pp. 214-217. Jul. 2004.
NLTK: The Natural Language Toolkit. Edward Loper and Steven Bird, Proceedings of the ACL Workshop on Effective Tools and Methodologies for Teaching Natural Language Processing and Computational Linguistics, Philadelphia, Association for Computational Linguistics, pp. 62-69. Jul. 2002.

(Continued)

*Primary Examiner*—Khanh B Pham
*Assistant Examiner*—Navneet K Ahluwalia
(74) *Attorney, Agent, or Firm*—Brinks Hofer Gilson & Lione

(57) ABSTRACT

An event analysis system monitors information available from both publicly and privately distributed networks of information for events that are relevant to the user's particular business concerns. Those concerns are defined in a customized model of the user's organization and external business environment. The system receives the information, detects events in the information, interprets the events, and determines implications of these events. The detection and implication proceeds with regard to specific entities, relationships between entities, and definitions of the types of events which may occur in the environment in which the entities exist. Accordingly, the analysis system intelligently adapts its processing to recognize and report events which may be of interest for any particular entity.

29 Claims, 15 Drawing Sheets

OTHER PUBLICATIONS http://genalytics.com, Building Next Generation Predictive Models Using Genetic Algorithm-based Software, 14pp.. Genalytics, Inc. 2003.

www.genalytics.com, Data Sheet, Genalytics Phone, Genalytics Phone: Phone Append our Reverse Look Up to Validate or Target your Prospects, 1 p., Genaytics, Inc. 2005.

Accenture, Technology Labs, Discover What Your Customers Really Think, 2pp., Accenture 2005.

Bloglines, Create a Personal Bloglines Page Loaded with the Freshest News About the Things You Love, 1p., 2003.

A. McCallum, Bow: A Toolkit for Statistical Language Modeling, Text Retrieval Classification and Clustering, 2pp., Sep. 12, 1998.

Intelliseek, Brandpulse Products, BrandPulse 360™, 2pp. 1997-2006.

Intelliseek, Brandpulse Products, BrandPulse CRM™, 2pp., 1997-2006.

Intelliseek, Brandpulse Products, BrandPulse™ Direct, 2pp., 1997-2006.

Intelliseek, Brandpulse Products, BrandPulse Internet™, 2pp., 1997-2006.

Intelliseek, Brandpulse Products, BrandPulse™ Overview, 2pp., 1997-2006.

Clearforest Text-Driven Business Intelligence, ClearForeset Tagging & Extraction Platform, 2pp., 2006.

A. McCallum, Rainbow, 6pp., Sep. 30, 1998.

Inxight, Inxight SmartDiscovery® Analysis Adapters and Connectors, 2pp., Inxight Software Inc., 2005.

www.yahoo.com, Sign In, 1p. Yahoo! Inc., 2006.

Inxight ThingFInder® Advanced, Inxight ThingFinder Advanced with Custom Entity Extraction, ThingFinder Advanced Delivers New Extensibility for Inxight Extraction Solutions, 1p., 2006.

www.inxight.com, Inxight SmartDiscovery™ The Complete Solution for Enterprise Information Discovery, 4pp., 2005.

Technorati™, About Technorati, Currently Tracking 31 Million Sites and 2.2 Billion links, 1p., 2006.

Data Sheet, Genalytics, Genalytics Knowledge Extract: Extract Meaning from Your Uninstructed, Data, 2pp., Genalytics, Inc. 2004.

Genalytics DB Extract, Advanced Data Extraction, Genalytics DB Extract: Advanced Data Extraction, Transformation and Scoring for Enterprise Data, Genalytics, Inc. 2006.

Genalytics Auto, List Management Solution, Genalytics, Auto: List Management Solution for Driving Successful Campaigns, 2pp., Genalytics, Inc., 2006.

Genalytics Model, Leverage More Data, Create Better Models, 2pp., Genalytics, Inc., 2006.

Genalytics Prospect, Automated Analytics and Targeted Analytics and Targeted Lists, 2pp., Genalytics, Inc., 2006.

Taming the Analytic Data Monster: An Advanced Approach to Data Extraction and Transformation for Enterprise Analytics, pp. 1-12, Genalytics, Inc., 2004.

* cited by examiner

| Entity Node | | 400 |
|---|---|---|
| orgDef ID | 402 | A |
| OneSourceID | 404 | 99999 |
| Identifiers | 406 | Acme Motor Company; Acme; AcMoCo |
| Full Name | 408 | Acme Motor Company |
| Displayed Name | 410 | Acme |

| Entity Relationship | | 412 |
|---|---|---|
| Focus | 414 | |
| Suppliers | 416 | steel, glass, rubber |
| Products | 418 | cars |
| ByProducts | 420 | emissions |
| Competitors | 422 | ABC Motor |
| Substitutes | 424 | |
| Consumers | 426 | |
| Complements | 428 | gasoline |
| Issues | 430 | |
| Subsidiaries | 432 | Volvo, Jaguar, Mazda |
| Parent Company | 434 | |

Figure 4

| Event Object | 700 |
|---|---|
| Title | 702 |
| Link | 704 |
| Description | 706 |
| Source Type | 708 |
| Entity ID | 710 |
| Event Type | 712 |
| Event Type Probability | 714 |
| Importance | 716 |
| Public Interest | 718 |
| Tokenized Title | 720 |
| Tokenized Description | 722 |
| Attribute List | 724 |
| Implication Messages | 726 |
| Extracted Entities | 728 |

Event Details                                                                1200

Overview

| Event Type: | Workforce size change |
| Importance: | ■■■■■ |
| Company: | Acme Motors |
| Labor Organization: | Unknown |
| Number Affected: | 5,000 |
| Location: | Asia |
| Reason: | "struggles to compete" |
| Date: | 11-21-2005 |
| Time: | Unknown |
| Tense: | Report |
| Confidence: | Unknown |

Confirm
Edit
Cancel

1212

1202

Buzz Analysis

Public Interest Level:   ■■■■                                              1204

Potential Implications

1206
Possible reduction in Acme's production costs (0 other signals of this implication detected)
Possible reduction in Acme's production capacity (0 other signals of this implication detected)

Sources

Acme slashing production and jobs (ABC Newspaper)                          1208 ▼

Source Text

1210
ABC Newspaper – Acme Motors Corp. said on Monday it would
cut a large number of jobs to stay competitive with XYZ Motor.

See original 1212

Event Model

Event Type Taxonomy 1402

| Management |
|---|
| Manager Name: PersonalName |

| Departure |
|---|
| Reason: Explanation |

| Position Change |
|---|
| Old Position: Job Title |
| New Position: Job Title |

| Recruit |
|---|
| Previous Employer: Entity |
| New Position: Job Title |

| Marketing |
|---|
| Scope: Custom |

Event Type Properties 1404

| ChildrenShareColor | True |
|---|---|
| Color | Blue |
| EventInstanceAttributes | Click to edit |
| EventTypeAttributes | Click to edit |
| EventTypePatterns | Click to edit |
| Name | Recruit |
| ParentName | Management |

Event Type Pattern Editor 1406

| Members: |
|---|
| expression=names, weight=1 |
| expression=appoint(s\|ed)?, weigh |
| expression=election of, weight=2 |
| expression=elect(s)?, weight=2 |
| expression=hire(s\|ed)?, weight=2 |

| Properties | |
|---|---|
| RegularExpression | Names |
| Weight | 1 |

[ Add ] [ Remove ]  [ OK ] [ Cancel ] [ Help ]

Implication Model 1502

| Scandal | If | company is experiencing a scandal |
| | Then | there may be a management change |

| Labor Demands | If | company is experiencing a scandal |
| | Then | there may be a management change |

| Hire | If | company hires new CFO |
| | Then | possible company purchase |

Edit Threat / Opportunity 1504

Enter text for rule:

| If | company hires new CFO |
| Then | possible company purchase |

Instructions
To create / edit Threat/Opportunity constraints:
- click 'Create New' to add a new constraint
- click a constraint visual to see its properties To create / edit Threat/Opportunity implications:
- Select an implied event from the drop-down box
- Select or create attribute values
- Enter a custom implications message

Constraints

| Triggering Event Type |
|---|
| Hire |
| Previous Employer |
| New Position |
| Manager Name |
| Date |
| Time |
| Tense |
| Confidence |

| Attribute Constraint List |
|---|
| MATCH |
| New Position |
| NON-EMPTY |
| Previous Employer |
| NON-EMPTY |
| Organization |
| Create New |

Define new Attribute properties:

| Type: | Match ▼ |
| Name: | New Position ▼ |
| Value(s): | | Add |
| CFO | | Delete |
| Chief Financial Officer | | |
| C.F.O. | | |

| Save | Cancel Edit | Delete |

Implications

Implied Event Type

| Merger ▼ |

| Acquirer | Organization ▼ |
| Price | Unknown ▼ |
| Organization | Previous Employer ▼ |
| Date | Unknown ▼ |

1500

Figure 15

MODEL-DRIVEN EVENT DETECTION, IMPLICATION, AND REPORTING SYSTEM

PRIORITY CLAIM

This application claims the benefit of priority from U.S. Provisional Patent Application Ser. No. 60/669,850, filed Apr. 8, 2005, which is incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to any software and data as described below and in the drawings hereto: Copyright© 2005-2006, Accenture, All Rights Reserved.

BACKGROUND

1. Technical Field

This invention relates to processing systems which intelligently process information received from a wide range of sources. In particular, this invention relates to an automated analysis system customized to a particular organization's operating environment, and which gathers information from relevant sources, detects events represented in the information that are likely to be relevant to the organization, determines implications of the events to the organization, processes those implications as inferred events, and reports the events.

2. Background Information

Modern communication technology has delivered unprecedented growth in information, sources of information, and electronic access to information. However, it is difficult, if not impossible, for an individual to obtain, search, and interpret the information for events of interest and their potential meaning or impact. For example, newspapers from almost every country in the world are available online. Yet, from a practical standpoint, the immense amount of time required to retrieve and read each newspaper dictates that a much smaller subset of newspapers are actually reviewed for pertinent information.

Accordingly, despite the general availability of vast information resources, a business often obtains an incomplete view of their operating environment, fails to understand or identify patterns in information, and does not or cannot properly interpret the patterns as they relate to the dynamics of that business. As examples, the past, present, and/or predicted future resource availability, as well as changes in the availability are known with only partial accuracy and without a clearly defined impact on the business. Formulating business strategy based on incomplete information subjects the business to undue risk and may limit profits, growth, and other desirable goals.

There is a need for addressing the problems noted above and others previously experienced.

BRIEF SUMMARY

An event analysis system equipped with a customized model of a particular business' concerns, analyzes information received from many different sources, and stored in an information database. The event analysis system detects relevant events, filters the events, infers new events from the detected events, and reports the events. Flexible models established in the event analysis system tailor the operation of the event analysis system to specific entities (including organizations, individuals, or other entities) and to relationships between entities.

An information source model identifies and characterizes the information sources from which the event analysis system may obtain information. An entity relationship model provides a representation of a particular entity (e.g., a business) as well as relationships of that entity to other entities. An event type model allows the event analysis system to define event types which are relevant to any particular entity. In addition, an event implication model defines implication rules. The event analysis system applies the implication rules to detected events. As a result, the event analysis system may determine new inferred events which may impact the entity for which event analysis is occurring. The entity for which event analysis is occurring is referred to as the event focus.

An event processing control program in the event analysis system coordinates the analysis performed by the event analysis system. The control program periodically scans information sources to retrieve and store, in an information database, new information potentially describing relevant events. The event processing control program implements a filtering step during which the control program recognizes and retains information relevant to entities defined in the environment model. Other information may be discarded, when it is not relevant to the entities established in the environment model. The control program initiates execution of an event detection engine to the newly retrieved information.

The event detection engine produces an event record which follows a standardized format. The format may include information about the event's event type, attributes, referenced organizations, the importance or priority of the event, the source text that describes the event, an address for the source text, or other information. The format may also include information specific to the data type that the event is based on. As an example, if the event is based on unstructured text, then the event detection engine may generate a tokenized or parsed version of the unstructured text.

The control program initiates execution of an implication engine to the event record. The implication engine produces two results. The first result is a description of an implied event which may be added to the event record. The implication engine prepares the description when the event record includes characteristics which signal the implied event. The second result is a separate event description for the implied event represented by a new event record.

The event analysis system stores all of the event records in the event database, including the originally detected events, as well as the event records describing inferred events. The control program also signals any processes which are consuming events. The processes may then retrieve the event records which represent the newly added events and inferred events from the event database. The processes may then report the events by updating a user interface or other information presentation.

Additionally, the control program may accept modifications to the data extracted by the automated event detection and implication processes. The modifications may come from any process that consumes the events, from a system operator, or from another source. In response, the event analysis system updates the event database to reflect the modifications, and re-applies the implication engine to the modified event. The event analysis system 100 may learn from the modifications, and, for example, suggest similar modifications in the future, thereby leading to enhanced future performance of the system.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 4 illustrates an entity node and an entity relationship which may be defined in an environment model.

FIG. 7 shows an event object defined according to a common event structure.

FIG. 12 shows an event detail window.

FIG. 14 shows a graphical user interface front end to an event model design tool.

FIG. 15 shows two different windows of a graphical user interface front end to an implication model design tool.

DETAILED DESCRIPTION

The discussion below, regardless of the particular implementation being described, is exemplary in nature, rather than limiting. For example, although selected aspects, features, or components of the implementations are depicted as stored in program, data, or multipurpose system memories, all or part of systems and methods consistent with the event analysis system may be stored on or read from other machine-readable media, for example, secondary storage devices such as hard disks, floppy disks, and CD-ROMs; electromagnetic signals; or other forms of machine readable media either currently known or later developed.

Furthermore, although this specification describes specific components of an event analysis system, methods, systems, and articles of manufacture consistent with the event analysis system may include additional or different components. For example, a processor may be implemented as a microprocessor, microcontroller, application specific integrated circuit (ASIC), discrete logic, or a combination of other types of circuits acting as explained above. Databases, tables, and other data structures may be separately stored and managed, incorporated into a single memory or database, or generally logically and physically organized in many different ways. The programs discussed below may be parts of a single program, separate programs, or distributed across several memories and processors.

In the discussion below, event detection steps include the collection of raw data (e.g., from news articles), converting the data into event objects, and filtering (and discarding) events that are not relevant. In addition, event detection steps also include classifying the events which were not discarded, extracting information from the data which characterizes the events, and building an event template. Extracting information about the events includes obtaining event attribute values, while building the event template includes adding the attribute values into attribute fields in event objects.

An event implication engine applies an event implication model to infer new events from existing detected events. The new events may be fed back into the implication engine, resulting in additional inferred events. The feedback process may continue iterating to generate additional new events, all of which are maintained in the event database, and any of which may also be fed back into the implication engine.

Figure 1:
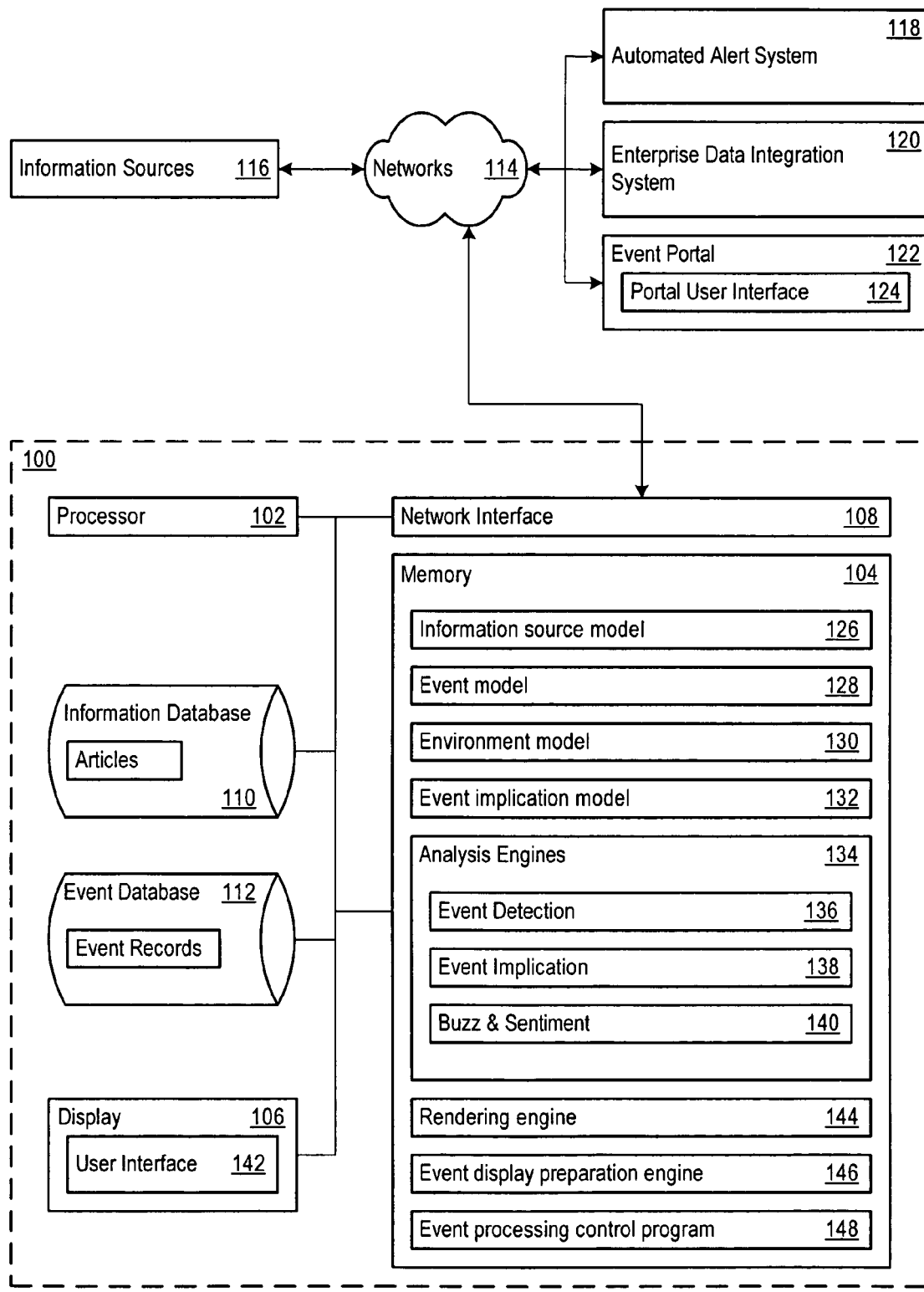
FIG. 1 illustrates an event analysis system for gathering information, identifying events, and interpreting the events.

FIG. 1 shows an event analysis system 100. As an overview, the event analysis system 100 monitors information available from information sources connected to both publicly and privately distributed networks. The event analysis system 100 retrieves the information, such as news articles, blog entries, web site content, and electronic documents (e.g., word processor or spreadsheet documents) from the information sources for analysis. Although the example of a news article from a Really Simple Syndication (RSS) feed is used below, it is noted that the event analysis system 100 may process information in any other format from any other source.

Once retrieved, the event analysis system 100 analyzes the article for events. The event details are extracted from the article and represented in a standardized way for further processing. The system 100 discards articles which are not relevant with respect to the environment model 130, and classifies events described in the remaining articles according to the event model. In particular, the event analysis system 100 determines relevant events, and alerts other systems, individuals, or other entities of the new event and its relevance.

The event analysis system 100 includes a processor 102, a memory 104, and a display 106. In addition, a network interface 108, an information database 110, and an event database 112 are present. The information database 110 stores articles received over the network 114 from the information sources 116. The event database 112 stores event objects constructed using information obtained from the articles, and modified and extended by further processing in the event analysis system 100. The event objects may share a common event structure which is independent of the information sources 116 from which the articles are received. The common format of the event structure facilitates subsequent processing of the event objects by a wide range of analysis tools, described below.

The event analysis system 100 may communicate the detected events, implications of the events (e.g., in the form of a newly created event flowing from an implication of a previously detected event), or both, for further processing by external entities. FIG. 1 shows an example in which an automated alert system 118 consumes originally detected events and inferred events produced by the event analysis system 100. The automated alert system 118 may include comparison logic which watches for specific types of events and produces an alert. The alert system 118 may send the alert to an individual or other system (e.g., a PDA, a personal computer, or pager) to perform a notification that the event has occurred or that the event has the potential implication determined by the event analysis system 100. As an additional example, the enterprise data integration system 120 may include a database management system or other information processing system which integrates event data into other data maintained for an enterprise.

An event portal 122 provides a remote external interface into the event analysis system 100. The event portal 122 may implement a portal user interface 124 which supports login and communication with the event analysis system 100. The event portal 122 may provide a representation (including text and/or or graphical elements) of the events (including inferred events arising from implications of existing events). The representation may assist, for example, a decision support role of the operator of the event portal 122.

The memory 104 stores one or more information source models 126, event models 128, environment models 130, and event implication models 132, which are explained in more detail below. The memory 104 also stores analysis engines 134. The analysis engines 134 may include an event detection engine 136, an event implication engine 138, and buzz and/or sentiment monitoring engines 140.

The processor 102 generates a user interface 142 on the display 106. The user interface 142 may locally provide graphical representations of events and their implications (e.g., in the form of inferred events) organized by company, competitor, or in another manner to an operator using the event analysis system 100. To that end, the event analysis system 100 may include a rendering engine 144. The rendering engine 144 may be implemented with programs which generate text and/or graphical representations (as examples, dashboards, charts, or text reports) of the events and their inferred events in the user interface 142. The rendering engine 144 may include a program such as Crystal Reports™ available from Business Objects of San Jose Calif., or any other drawing, report generation, or graphical output program. The rendering engine 144 may parse output files generated by the event display preparation engine 146. An event processing control program 148 coordinates the processing of the event analysis system 100, as described in more detail below.

The network interface 108 connects the event analysis system 100 to the networks 114. The networks 114 may be internal or external networks, including, as examples, company intranets, local area networks, and the Internet. The networks 114 connect, in turn, to the information sources 116. The system 100 connects to the information sources 116 specified by the information source model 126 in the memory 104. Accordingly, the processor 102 reads the information source model 102, determines which information sources 116 to contact, then retrieves articles from the information sources 116 through the networks 114.

The system 100 also includes graphical modeling tools 150. The graphical modeling tools 150 display user interfaces through which an operator may establish and modify the models 126-132 without the burden of writing code. In one implementation, the modeling tools 150 include an event modeling tool, an implication modeling tool, and an environment modeling tool which support the definition and modification of the event model 128, the event implication model 132, and the environment model 130, respectively. An information source modeling tool may also be provided to provide a graphical user interface for modifying the information source model 126. The modeling tools 150 are described in more detail below.

Figure 2:
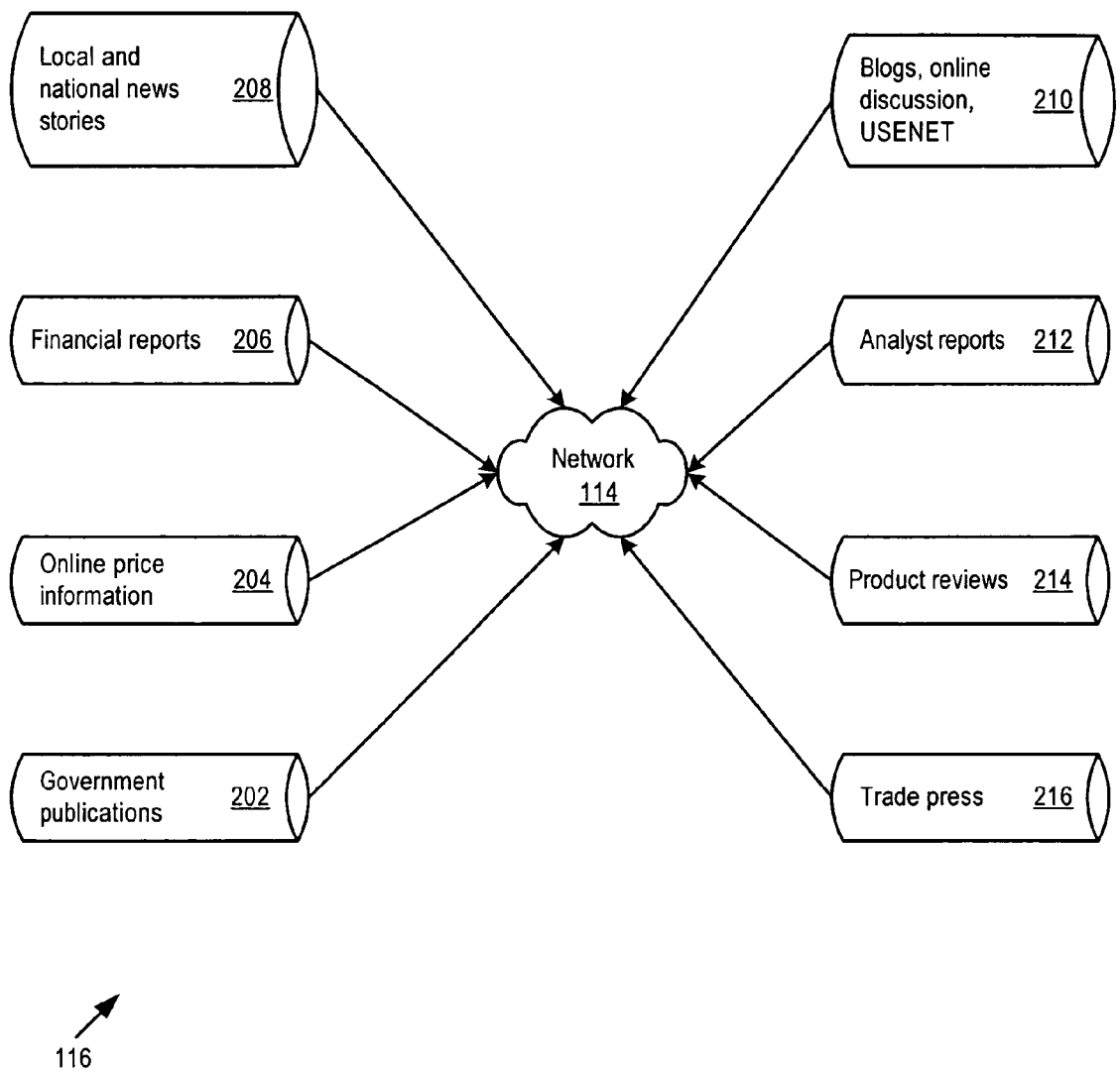
FIG. 2 shows information sources which the event analysis system 100 may systematically monitor to obtain information.

FIG. 2 shows several examples of the information sources 116. The information sources 116 may include government publication information sources 202, online price information sources 204, financial report information sources 206, and local and national news information sources 208. The information sources may also include one or more blog, online discussion, or USENET information sources 210, analyst report information sources 212, product review information sources 214, and trade press information sources 216.

The information sources 202-216 are exemplary only, and the event analysis system 100 may connect to any other information source. The information sources 202-216 may be driven by web sites, free or subscription electronic databases (e.g., the Lexis/Nexis™ databases), news groups, electronic news feeds, journal article databases, manual data entry services, or other sources. The event analysis system 100 may access the information sources 202-216 using a Hypertext Transport Protocol (HTTP) interface, File Transfer Protocol (FTP) interface, web service calls, message subscription service, or using any other retrieval mechanism.

The networks 114 may adhere to a wide variety of network topologies and technologies. For example, the networks 132 may include Ethernet and Fiber Distributed Data Interconnect (FDDI) networks. The network interface 108 is assigned one-or more network addresses. The network address may be a packet switched network identifier such as a Transmission Control Protocol/Internet Protocol (TCP/IP) address (optionally including port numbers), or any other communication protocol address. Thus, the networks 114 may represent a transport mechanism or interconnection of multiple transport mechanisms for data exchange between the event analysis system 100 and the information sources 202-216, the automated alert system 118, the enterprise data integration system 120, and the event portals 122.

The information source model 126 may establish, define, or otherwise identify information sources. The information source model 126 may use include (e.g., "news.abcbnewspaper.com"), identifiers (e.g., an IP address and port number), or other identifiers to specify information sources which the event analysis system 100 will monitor. The processor 102 may then systematically monitor and gather articles from one or more of the information sources 116 to build the information compilation in the information database 110. The processor 102 may supplement the information compilation at any time, such as on a periodic schedule (e.g., twice per day), when instructed by an operator, or when receiving a message that a new article is available.

In other implementations, the information source model 126 includes configuration information. The configuration information may specify how to access a given information source 116, as well as information characterizing the information source 116. The characterizing information may include weighting values for individual information sources which record the reputation, reliability, or quality of the information source (e.g., a weighting value between 1 and 5). The event analysis system 100 may use the configuration information in subsequent processing stages. For example, the event analysis system 100 may determine measures of event accuracy or probability based on the weighting values.

Table 1 shows an example of a source model instance. The example shown in Table 1 is an eXtensible Markup Language (XML) instance, with tags which specify the name, location, connection method, update frequency (e.g., once per day), and weighting value for the information source. The information source models 126 may represent a collection of such instances.

TABLE 1

```
<source>
    <name>ABC Newspaper </name>
    <url>http://www.abcnewspaper.com/news_drop/netcenter/netcenter.rdf
</url>
    <connectionMethod>RSS</connectionMethod>
    <updateFrequency>1.0</updateFrequency>
    <reputation>4</reputation>
</source>
```

The name tag provides a descriptive string to describe the source. The url tag indicates where to access the requested information. The connectionMethod tag defines how to access the source. In this example, the event analysis system 100 uses an RSS feed. For other sources, the connectionMethod tag may specify other access mechanisms, including ftp, http, or other mechanisms.

The updateFrequency tag determines how often the event analysis system 100 accesses a particular information source 116. In this example, the value '1.0' specifies one access per day. The reputation tag assigns a weighting value to each source, on a scale of 1-5 (5 being most reputable). The event analysis system may use this information to resolve conflicting stories between different information sources and to build a measure of event accuracy or likelihood. Additional extensions include configuration parameters which specify login name and password, timeout constraints, and data transfer size limits or time limits.

The event models 128 define the type of events that can occur and the attributes which belong to instances of each event type. For example, "Hire" is an event type with attributes of "New employer", "Previous employer", "New position", and "Manager name". Thus, when the event analysis system 100 detects a "Hire" event in an article obtained from an information source 116, the event analysis system 100 will scan through the article text to determine who the previous employer was, what the new position is, and what the manager's name is.

Figure 3:
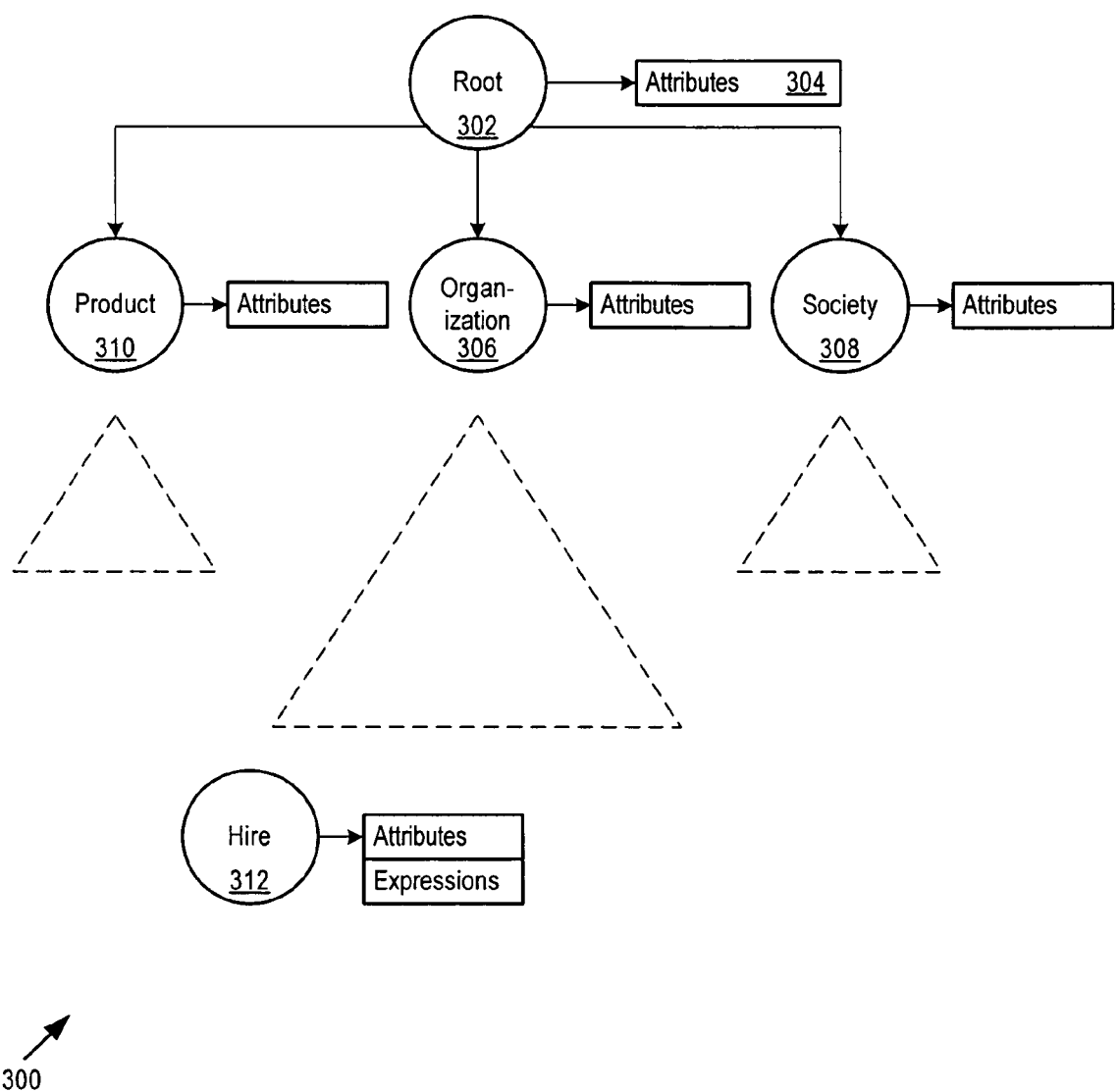
FIG. 3 shows an event model including event records defined in a hierarchical tree.

FIG. 3 shows that the event model 128 may include event nodes defined as a hierarchical tree 300, starting with a root node 302 and root attributes 304. In one implementation, the root node has three child nodes: an organization-centered node 306, a society-centered node 308, and a product-centered node 310. The organization-centered node 306 is the parent node for child nodes that represent events that directly affect an organization, or are generated by the organization. A new ad campaign, a labor dispute, and a stock price change are examples of organization-centered events. The tree 300 separates event types into organization-centered, society-centered, and product-centered events, but any other organization may be implemented. The society-centered noted 308 categorizes changes that are external to the company, such as environmental changes or demographic changes. The product-centered node 310 categorizes events which are relevant to a particular product that is created by a company or organization. A product recall, a manufacturing difficulty that affects a product, and a rebate on a product are examples of product-centered events. The categories are not rigid. Instead, different system implementations may classify the same event into different categories and may define the fewer, more, or different categories and event nodes.

Each child node inherits the attributes from the root node, and each child node may optionally include additional attributes individually associated with that child node. Each child node 306-310 may have children nodes as well, which inherit the attributes from parent, grandparent, and further prior nodes. The tree 300 ends in leaf nodes (e.g., the leaf node 312), a node with no child nodes. The leaf nodes are associated with expressions which help the system 100 determine that article text includes an event of the event type represented in a leaf node. The tree 300 provides a structure in which similar events may be grouped together (e.g., for ease of comprehension). The tree 300 also increases efficiencies by avoiding duplication of information that is shared by children of the same parent. By allowing children to inherit attributes of their parents, the attributes may be specified only once (in the parent) instead of more than once (in all of the children).

When the event analysis system 100 classifies an event, the event analysis system 100 creates an event object and builds the event object according to one of the event types represented by a leaf node. As an example, an event may be classified as a "Hire" event, including the inherited attributes from prior nodes such as the organization-centered node 306 and the root node 302. Thus, the event model 128 defines the form and content of the event objects for many different types of events.

Table 2 shows an example of the implementation of a root event type in the event model 128 corresponding to the root node 302.

TABLE 2

```
<EventType label="Root" color="DarkGray">
    <toolData>
        <childrenShareColor>False</childrenShareColor>
    </toolData>
    <categoryDetectionInfo>
        <newsStoryDetectionPatterns/>
    </categoryDetectionInfo>
    <eventInstanceAttributes>
    <eventInstanceAttribute>
        <name>Date</name>
        <dataType><dataType>
        <dataType></dataType>
        <preRegex>
        </preRegex>
        <postRegex>
        </postRegex>
        <display>
            <summary>True</summary>
            <detail>True</detail>
        </display>
    </eventInstanceAttribute>
    <eventInstanceAttribute>
        <name>Time</name>
        <dataType><dataType>
        <dataType></dataType>
        <preRegex>
        </preRegex>
        <postRegex>
        </postRegex>
        <display>
            <summary>True</summary>
            <detail>True</detail>
        </display>
    </eventInstanceAttribute>
    <eventInstanceAttribute>
        <name>Tense</name>
        <dataType>
        </dataType>
        <preRegex>
        </preRegex>
        <postRegex>
        </postRegex>
        <display>
            <summary>True</summary>
            <detail>True</detail>
        </display>
    </eventInstanceAttribute>
    <eventInstanceAttribute>
        <name>Confidence</name>
        <dataType>
```

TABLE 2-continued

```
    </dataType>
    <preRegex>
    </preRegex>
    <postRegex>
    </postRegex>
    <display>
    <summary>True</summary>
    <detail>True</detail>
    </display>
    </eventInstanceAttribute>
    </eventInstanceAttributes>
</EventType>
```

In Table 2, the EventType (event type) tag includes a label attribute which specifies the name of the event type (e.g., Root), and the color used to display the node (e.g., in a model building tool on the user interface 142). The toolData tag specifies information which may be used by a model building tool. In this example, the toolData tag includes a color sharing tag that tells the model building tool that any children of the root event type should be displayed in the same color as the root node by default.

The categoryDetectionInfo (category definition) tags specify text strings which the event analysis system 100 uses to detect events which match the event type. In this example, events are not assigned to the root event type, and no text strings are defined. However, the event model 128 will specify text strings for leaf event nodes.

The eventInstanceAttributes (event instance attribute) tags specify the attributes for which the event analysis system 100 will search for values in the article, for any event that belongs to the event type, or any of the event type's children. In this example, the attributes 'date', 'time', 'tense', and 'confidence' are defined. Because the root node includes 'date', 'time', 'tense', and 'confidence' attributes, the event analysis system 100 will search the article to determine the date this event occurred or will occur, what time the event occurred or will occur, whether the event occurred in the past or will occur in the future, and how confident the event analysis system 100 is are about the analysis of the event, regardless of the specific type of event. The attributes may vary widely in form, number, and type between implementations. In particular, two different implementations of the system may define the same event or events, yet use similar or very different attributes to characterize the events.

Within the event instance attribute, the "name" field contains the name of the event instance attribute. The "dataType" field contains a description of the data types that serve as a value for the attribute. This field may specify, as examples, that a "person's name", "geographical location", "quantity", "currency", "company name", "job title", or other data type may provide the value. Knowing what data type provides the value assists the event analysis system 100 with identifying the value in the text itself.

The "preRegex" field specifies a regular expression that identifies text that event analysis system 100 may search for prior to (e.g., immediately prior to) the text that serves as the value for the event instance attribute. For example, the phrase "will be leaving" found before a company's name may point to the company name as value for the "Previous employer" event instance attribute for the "Hire" event type. The "postRegex" field is similar to the "preRegex" field, but the event analysis system 100 uses the postRegex field to specify a regular expression which identifies strings expected to come immediately after the value for the event instance attribute.

The "display" field contains information about whether the event instance attribute will be shown on either a "summary" display of the event, a "detailed" display of the event, both, or neither. For example, the user interface 142 may display either or both of a broad-view or summary window, as well as pop-up windows giving more details about an individual event (i.e., a detailed display).

Table 3 shows a definition for the organization centered event type, a child of the root node.

TABLE 3

```
<EventType label="Organization-Centered" color="Silver"
acronym="OAA" scope="general" focus="organization"
parent="Root">
<toolData>
<childrenShareColor>False</childrenShareColor>
</toolData>
<categoryDetectionInfo>
<newsStoryDetectionPatterns/>
</categoryDetectionInfo>
<eventInstanceAttributes/>
</EventType>
```

The event type provides an acronym for the event type (e.g., "OAA"), a scope specifier, and focus specifier, and a parent specifier which links the event type to a parent event type (i.e., the root event type). The scope and focus specifiers provide fields for future implementations which further increase the flexibility and capabilities of the system.

Table 4 shows an example of a 'hire' event type. Other events may share the same or similar tags and structure.

TABLE 4

```
<EventType label="Hire" color="DeepSkyBlue" parent="Management">
<toolData>
<childrenShareColor>True</childrenShareColor>
</toolData>
<categoryDetectionInfo>
<newsStoryDetectionPatterns>
<pattern regularExpression="name(s|d)" weight="1"/>
<pattern regularExpression="appoint(s|ed)?" weight="2"/>
<pattern regularExpression="appointment(s)?" weight="2"/>
<pattern regularExpression="election of" weight="2"/>
<pattern regularExpression="elect(s|ed)?" weight="2"/>
<pattern regularExpression="hire(s|d)?" weight="2"/>
<pattern regularExpression="promoted to" weight="2"/>
<pattern regularExpression="assume(s)? control" weight="2"/>
<pattern regularExpression="(of the (year|world))|most|best|greatest"
weight="-100"/>
<pattern regularExpression="service appointment(s)?" weight="-100"/>
<pattern regularExpression="code(-| )?name(s|d)?" weight="-100"/>
</newsStoryDetectionPatterns>
</categoryDetectionInfo>
<eventInstanceAttributes>
<eventInstanceAttribute>
<name>Previous Employer</name>
<dataType>
company
</dataType>
<preRegex>
"(is leaving)|(will be leaving)"
</preRegex>
<postRegex>
"has fired"
</postRegex>
<display>
<summary>True</summary>
<detail>True</detail>
</display>
</eventInstanceAttribute>
<eventInstanceAttribute>
<name>New Position</name>
<dataType>
</dataType>
```

TABLE 4-continued

```
<preRegex>
</preRegex>
<postRegex>
</postRegex>
<display>
<summary>True</summary>
<detail>True</detail>
</display>
</eventInstanceAttribute>
</eventInstanceAttributes>
</EventType>
```

Table 4 shows that the 'Hire' event type is a child of the 'Management' event type, and that 'Hire' events are displayed as DeepSkyBlue boxes in the user interface 142 (and in other interfaces, such as a model building tool). The newsStoryDetectionInfo tags establish the regular expressions, under the newsStoryDetectionPatterns tag, which the event analysis system 100 uses to identify events which are 'Hire' events. Each regular expression (bounded by the 'pattern' tag) may specify the regular expression and a weight.

The event analysis system 100 uses the patterns and weights to determine whether a particular event belongs to a particular event type. Thus, the event analysis system 100 may distinguish between events when regular expressions from different event types are located in the same article. When regular expressions from multiple different event types are found in a single article, the system 100 adds the weights for the expressions. The highest resulting weight is the event type to which the system 100 classifies the event. Note that weights can be positive or negative. Negative weights may be applied when a regular expression matches text which points away from the event type. For example, matching the phrase "service appointment" or "of the year" would be clear indicators that the article does not describe a 'hire' event. Accordingly, large negative weights are assigned to those regular expressions.

Note that the 'hire' event type specifies that the value of the "Previous Employer" event instance attribute should be a company name. The "preRegex" (i.e., prior regular expression) field defines a regular expression that the event analysis system 100 uses to identify phrases that are expected or likely to come before (e.g., immediately before) the value for the Previous Employer attribute. In this example, when the event analysis system 100 finds the text "is leaving" followed by a company name, the event analysis system 100 determines that the company name should be the value for the Previous Employer attribute.

The "postRegex" (i.e., post regular expression) fields define a regular expression that is likely to occur after the value for the Previous Employer attribute. For example, the event analysis system 100 may establish the text "has fired" as text expected to come immediately after a company name to suggest that that company name is the appropriate value for the Previous Employer attribute.

The event model may also specify variables instead of text strings that the event analysis system 100 uses to match an event. The variables may be flagged by a leading character (e.g., '$'), followed by a variable, for example, '${changephrase}'. The event analysis system 100 may expand a variable using rules defined according to a specific grammar.

Table 5 shows an example of a grammar.

TABLE 5

```
increasephrase:(will |have |has )?(increase(d)?|((go |went
)(way)?up)|r(i|o)se|skyrocket(ed)?|jump(ed)?|gain(ed?)|
buoy(ed)?|inch(ed)?|recover(ed)?)
decreasephrase:(will |have |has )?(decrease(d)?|((go |went
)(way)?down)|drop(ped)?|fall|fell|sink|sank|slid(e)?|hit
bottom|dip(ped)?|sag(ged)?|peak(ed)?|inch(ed)?|falter(ed)?)
changephrase:((${increasephrase})|(${decreasephrase}))
```

The grammar shown in Table 5 specifies how to expand variables into regular expressions for pattern matching. In particular, the grammar shown in Table 5 specifies that "${changephrase}" should be expanded into "${increasephrase}|${decreasephrase}". In turn, the grammar specifies that "${increasephrase} is expanded into "(will|have|has)?(increase(d)?|((go|went)(way)?up)|r(i|o)se|skyrocket(ed)?|jump(ed)?|gain(ed?)|buoy(ed)?|inch(ed)?|recover(ed)?). Similarly, the grammar specifies that "${decreasephrase}" is expanded into "(will|have|has)?(decrease(d)?|((go|went)(way)?down)|drop(ped)?|fall|fell|sink|sank|slid(e)?|hit bottom|dip(ped)?|sag(ged)?|peak(ed)?|inch(ed)?|falter(ed)?)".

The event analysis system 100 thereby implements macros which allow shorter forms to be used in the event model, allow re-use of common phrases, and that significantly increases the flexibility of the event model. The event analysis system 100 may store the grammar in the memory 104, in a file on disk, or in any other location for reference when parsing the event model.

Tables 6 and 7 show examples of the product centered node 306 and the society centered node 308.

TABLE 6

```
<EventType label="Product-Centered" color="Silver" acronym="OPC"
scope="general" focus="organization" parent="Root">
<toolData>
<childrenShareColor>False</childrenShareColor>
</toolData>
<categoryDetectionInfo>
<newsStoryDetectionPatterns/>
</categoryDetectionInfo>
<eventInstanceAttributes>
<eventInstanceAttribute>
<name>Product</name>
<dataType>
</dataType>
<preRegex>
</preRegex>
<postRegex>
</postRegex>
<display>
<summary>True</summary>
<detail>True</detail>
</display>
</eventInstanceAttribute>
</eventInstanceAttributes>
</EventType>
```

TABLE 7

```
<EventType label="Society-Centered" color="Silver" parent="Root">
<toolData>
<childrenShareColor>False</childrenShareColor>
</toolData>
<categoryDetectionInfo>
<newsStoryDetectionPatterns/>
</categoryDetectionInfo>
<eventInstanceAttributes>
```

TABLE 7-continued

```
<eventInstanceAttribute>
<name>Entities</name>
<dataType>
</dataType>
<preRegex>
</preRegex>
<postRegex>
</postRegex>
<display>
<summary>True</summary>
<detail>True</detail>
</display>
</eventInstanceAttribute>
<eventInstanceAttribute>
<name>Status</name>
<dataType>
</dataType>
<preRegex>
</preRegex>
<postRegex>
</postRegex>
<display>
<summary>True</summary>
<detail>True</detail>
</display>
</eventInstanceAttribute>
</eventInstanceAttributes>
</EventType>
```

Table 8 shows an example of the events established in the tree 300 and which may be defined in the event model 128. In the example, Root is the root event, Organization-centered, Product-centered, and Society-centered are children of the Root event. As examples, the Financial, Image, Labor Relations, Legal, Management, Marketing, and Partnering events are children of the organization-centered event. The Analyst Report, Earnings guidance, Earnings report, Market report, and Stock price change are examples of leaf nodes under the Financial node. Any other attributes or regular expressions may be defined for the events or used to locate the events. Event types are very flexible and may be organized, defined, or established into multiple event types in many different ways. For example, one implementation of the system 100 may include a Product Price Change event, while another implementation may define separate Product Price Increase and Product Price Decrease events.

TABLE 8

```
<EventTypes>
<EventType label="Root" color="DarkGray">
<EventType label="Organization-Centered" color="Silver"
acronym="OAA" scope="general" focus="organization" parent="Root">
<EventType label="Financial" color="Lime"
parent="Organization-Centered">
<EventType label="Analyst report" color="Lime" parent="Financial">
<EventType label="Earnings guidance" color="Lime"
parent="Financial">
<EventType label="Earnings report" color="Lime" parent="Financial">
<EventType label="Market report" color="Lime" parent="Financial">
<EventType label="Stock price change" color="Lime"
parent="Financial">
<EventType label="Image" color="LavenderBlush"
parent="Organization-Centered">
<EventType label="Accident" color="LavenderBlush" parent="Image">
<EventType label="Ad campaign (image)" color="LavenderBlush"
parent="Image">
<EventType label="Scandal" color="LavenderBlush" parent="Image">
<EventType label="Labor relations" color="MediumSeaGreen"
parent="Organization-Centered">
<EventType label="Labor demands" color="MediumSeaGreen"
parent="Labor relations">
<EventType label="Public demonstration" color="MediumSeaGreen"
parent="Labor relations">
<EventType label="Strike" color="MediumSeaGreen" parent="Labor
relations">
<EventType label="Workforce size change" color="MediumSeaGreen"
parent="Labor relations">
<EventType label="Legal" color="Khaki" parent="Organization-
Centered">
<EventType label="Bankruptcy" color="Khaki" parent="Legal">
<EventType label="Criminal" color="Khaki" parent="Legal">
<EventType label="Lawsuit" color="Khaki" parent="Legal">
<EventType label="Management" color="DeepSkyBlue"
parent="Organization-Centered">
<EventType label="Departure" color="DeepSkyBlue"
parent="Management">
<EventType label="Hire" color="DeepSkyBlue" parent="Management">
<EventType label="Position change" color="DeepSkyBlue"
parent="Management">
<EventType label="Marketing" color="MediumSeaGreen"
parent="Organization-Centered">
<EventType label="Ad campaign (marketing)" color="MediumSeaGreen"
parent="Marketing">
<EventType label="Charitable donation" color="MediumSeaGreen"
parent="Marketing">
<EventType label="Event sponsorship" color="MediumSeaGreen"
parent="Marketing">
<EventType label="Press release" color="MediumSeaGreen"
parent="Marketing">
<EventType label="Public presentation" color="MediumSeaGreen"
parent="Marketing">
<EventType label="Partnering" color="LightCoral" parent="Organization-
Centered">
<EventType label="Agreement" color="LightCoral" parent="Partnering">
<EventType label="Co-branding" color="LightCoral"
parent="Partnering">
<EventType label="Joint venture" color="LightCoral"
parent="Partnering">
<EventType label="Merger" color="LightCoral" parent="Partnering">
<EventType label="Product-Centered" color="Silver" acronym="OPC"
scope="general" focus="organization" parent="Root">
<EventType label="Product attribute change" color="AliceBlue"
parent="Product-Centered">
<EventType label="Feature change" color="AliceBlue" parent="Product
attribute change">
<EventType label="Price change" color="AliceBlue" parent="Product
attribute change">
<EventType label="Product discontinuation" color="Tomato"
parent="Product line change">
<EventType label="Product introduction" color="Tomato"
parent="Product line change">
<EventType label="Product production change" color="-12550016"
parent="Product-Centered">
<EventType label="Production capacity change" color="-12550016"
parent="Product production change">
<EventType label="Production cost change" color="-12550016"
parent="Product production change">
<EventType label="Production location change" color="-12550016"
parent="Product production change">
<EventType label="Production method change" color="-12550016"
parent="Product production change">
<EventType label="Ad campaign (product promotion)"
color="-12829441" parent="Product promotion">
<EventType label="Rebate" color="-12829441" parent="Product
promotion">
<EventType label="Special financing" color="-12829441"
parent="Product promotion">
<EventType label="Product quality" color="Orange" parent="Product-
Centered">
<EventType label="Award" color="Orange" parent="Product quality">
<EventType label="Design flaw" color="Orange" parent="Product
quality">
<EventType label="Manufacturing flaw" color="Orange" parent="Product
quality">
<EventType label="Recall" color="Orange" parent="Product quality">
<EventType label="Review" color="Orange" parent="Product quality">
<EventType label="Society-Centered" color="Silver" parent="Root">
<EventType label="Cultural trend" color="PaleVioletRed"
parent="Society-Centered">
<EventType label="Attitude change" color="PaleVioletRed"
parent="Cultural trend">
```

TABLE 8-continued

```
<EventType label="Demographic change" color="PaleVioletRed"
parent="Cultural trend">
<EventType label="Economic trend" color="Cornsilk" parent="Society-
Centered">
<EventType label="Economic news" color="Cornsilk" parent="Economic
trend">
<EventType label="Regulatory change" color="PaleTurquoise"
parent="Society-Centered">
<EventType label="Environmental" color="PaleTurquoise"
parent="Regulatory change">
<EventType label="Labor" color="PaleTurquoise" parent="Regulatory
change">
<EventType label="Privacy" color="PaleTurquoise" parent="Regulatory
change">
<EventType label="Safety" color="PaleTurquoise" parent="Regulatory
change">
<EventType label="Technology trend" color="LimeGreen"
parent="Society-Centered">
<EventType label="Obsolesence" color="LimeGreen"
parent="Technology trend">
<EventType label="Technology development" color="LimeGreen"
parent="Technology trend">
</EventTypes>
```

Table 9 shows examples of the attributes (in single quotes) and regular expressions (in double quotes) defined for specific events.

TABLE 9

| Event | Attributes and Regular Expressions |
|---|---|
| Financial Analyst Report or a Market Report | 'value' and 'valence' 'analyst' and 'issues raised' |
| earnings guidance or an earnings report | 'timespan' |
| Stock price change | 'percent change', and 'split' "stock price ${changephrase}" "shares ${changephrase}" |
| Image | 'issue' |
| ad campaign | 'focus' and 'channel' |
| scandal | 'person' |
| labor relations | 'labor organization' |
| labor demands | 'demands' and 'issues' |
| public demonstration | 'location', 'message', and 'size' |
| strike | 'management positions' and 'labor positions' |
| workforce size change | 'number effected', 'location', and 'reason' |
| criminal | 'charges', 'prosecution stage', and 'defendant' |
| lawsuit | 'suit type', 'dollar value', 'issues', 'prosecution stage', 'plaintiff' and 'defendant' |
| management | 'manager name' |
| departure | 'reason' "quit(s)?" "resign(s\|ed\|ing)" "fired" "retir(e\|es\|ing\|ement)" "leaving" "leave(s)?(?!( a))" |
| position change | 'old position' and 'new position' |
| marketing | 'scope' |
| ad campaign | 'topic' and 'channel' |
| charitable donation | 'charity' |
| event sponsorship | 'event type' "event(?=(.*sponsorship))" "sponsor(?=(.*event))" |
| press release | 'topic' |
| public presentation | 'presenter' and 'location' |
| partnering | 'organizations' |
| agreement | 'duration' and 'promises' |
| co-branding | 'product' |
| joint venture | 'type', 'purpose' and 'size' "hooks up with" "joint venture" "joint company" "partner" "teaming" |

TABLE 9-continued

| Event | Attributes and Regular Expressions |
|---|---|
| | "teams(s) ? (up )?with" "join(s) forces" "combines(s)? forces" "alliance" |
| merger | 'acquirer' and 'price' |
| feature | 'feature' |
| price | 'old price' and 'new price' |
| product discontinuation | 'reason' "discontinu(e\|es\|ed\|ing)" "exit(s\|ed\|ing)? the market" |
| product introduction | 'features', 'competitors', and 'price' |
| production location change | 'old location' and 'new location' |
| product promotion | 'type', 'duration', 'target', and 'objective' |
| ad campaign | 'focus' and 'channels' |
| rebate | 'amount' "rebate(s)?" "mail-in" |
| award | 'award' and 'award source' "award(?!(-\| )?winning)" "award(s)?" "winner(s)?" "win(s)?(?=.*(prize\|award\|honor\|best))" "rates(?=.*(top\|best\|highest))" "name(s\|d)(?=.*of the year)" "name(s\|d)(?=.*best)" "best(?=.*(of 20\d\d))" "best(?=.*(of the year))" "honor(ed\|s)?" "most respected" "prize(s)?" "world(-\| )record" "excellence in" |
| design flaw or manufacturing flaw | 'plants' |
| recall | 'problem type', 'number', and 'cost of remedy' "recall" "recall(ing\|s)" |
| review | "(magazine\|product) review(s)?" "comparo" "comparison" "round(-)?up" |
| cultural trend | 'demographic', and 'strength' |
| attitude change | 'target' and 'change direction' |
| demographic change | "demographic change" "demographic trend" "change in demographic(s)?" "changing demographic(s)?" |
| environmental | 'scope', 'regulatory agency', 'new restriction', 'old restriction', and 'estimated cost' "kyoto treaty" "global warming" "environmental" "epa" "e.p.a." "greenhouse" "greenpeace" "fuel economy" "energy consumption" "emission(s)?" "eco-" |
| technology trend | 'technology' |
| obsolescence | 'reason' and 'replacement technology' |
| technology development | 'technology replaced' |

The environment model 130 defines entities and the relationships between entities. Table 10 shows an example of an XML definition of entities.

TABLE 10

```
<entityDefs>
    <orgDef ID="CBA" OneSourceID="153329" Identifiers="Brilliance China"
FullName="Brilliance China Automotive Holding" DisplayedName="Brilliance
China" />
    <orgDef ID="CTB" OneSourceID="8035" Identifiers="Cooper"
FullName="Cooper Tire and Rubber company" DisplayedName="Cooper" />
    <orgDef ID="DCX" OneSourceID="88129" Identifiers="DaimlerChrysler;
Chrysler" FullName="DaimlerChrysler AG" DisplayedName="DaimlerChrysler"
/>
    <orgDef ID="DENSO" OneSourceID="91196" Identifiers="Denso"
FullName="Denso Corporation" DisplayedName="Denso" />
    <orgDef ID="DPH" OneSourceID="42787936" Identifiers="Delphi"
FullName="Delphi Corporation" DisplayedName="Delphi" />
    <orgDef ID="F" OneSourceID="12338" Identifiers="Ford Motor Company;
Ford; FoMoCo" FullName="Ford Motor Company" DisplayedName="Ford" />
    <orgDef ID="FIA" OneSourceID="63645" Identifiers="Fiat" FullName="Fiat
S.p.A." DisplayedName="Fiat" />
    <orgDef ID="FSS" OneSourceID="10965" Identifiers="Federal Signal"
FullName="Federal Signal Corporation" DisplayedName="Federal Signal" />
    <orgDef ID="GM" OneSourceID="13001" Identifiers="General Motors Corp.;
General Motors Corporation; General Motors Corp; General Motors; GM"
FullName="General Motors Corporation" DisplayedName="GM" />
    <orgDef ID="GT" OneSourceID="13495" Identifiers="Goodyear"
FullName="Goodyear" DisplayedName="Goodyear" />
    <orgDef ID="HMC" OneSourceID="14737" Identifiers="Honda"
FullName="Honda Motor Company, LTD" DisplayedName="Honda" />
    <orgDef ID="MNC" OneSourceID="175532" Identifiers="Monaco"
FullName="Monaco Coach Corporation" DisplayedName="Monaco" />
    <orgDef ID="NAV" OneSourceID="169908" Identifiers="Navistar"
FullName="Navistar International" DisplayedName="Navistar" />
    <orgDef ID="NSANY" OneSourceID="20835" Identifiers="Nissan"
FullName="Nissan Motor Co., Ltd" DisplayedName="Nissan" />
    <orgDef ID="OSK" OneSourceID="21800" Identifiers="Oshkosh"
FullName="Oshkosh Truck Corporation" DisplayedName="Oshkosh" />
    <orgDef ID="PCAR" OneSourceID="21980" Identifiers="PACCAR"
FullName="PACCAR Incorporated" DisplayedName="PACCAR" />
    <orgDef ID="PEUGY.PK" OneSourceID="88711" Identifiers="PSA; Peugeot;
Citroen" FullName="PSA Peugeot Citroen S.A."
DisplayedName="Peugeot/Citroen" />
    <orgDef ID="SPAR" OneSourceID="26622" Identifiers="Spartan"
FullName="Spartan Motors Incorporated" DisplayedName="Spartan Motors"
/>
    <orgDef ID="TRW" OneSourceID="48618062" Identifiers="TRW"
FullName="TRW Automotive Holdings Corp." DisplayedName="TRW" />
    <orgDef ID="TM" OneSourceID="28470" Identifiers="Toyota"
FullName="Toyota Motor Corporation" DisplayedName="Toyota" />
    <orgDef ID="VC" OneSourceID="43489502" Identifiers="Visteon"
FullName="Visteon Corporation" DisplayedName="Visteon" />
    <orgDef ID="VLKAY.PK" OneSourceID="88276" Identifiers="Volkswagen;
VW" FullName="Volkswagen AG" DisplayedName="Volkswagen" />
    <orgDef ID="VOLVY" OneSourceID="30176" Identifiers="Volvo"
FullName="Volvo AB" DisplayedName="Volvo" />
    <orgDef ID="MAZDA" OneSourceID="91679" Identifiers="Mazda"
FullName="Mazda Motor Corporation" DisplayedName="Mazda"
/>
    <orgDef ID="JAGUAR" DisplayedName="Jaguar" Identifiers="Jaguar"
FullName="Jaguar Cars Ltd" OneSourceID="42245870" />
    <orgDef ID="KIA" DisplayedName="Kia" Identifiers="Kia" FullName="Kia
Motors Corporation" OneSourceID="91824" />
    <orgDef ID="BMW" DisplayedName="BMW" Identifiers="Bayerische
Motoren Werke; BMW; Bayerische Motoren Werke AG"
FullName="Bayerische Motoren Werke AG" OneSourceID="88104" />
    <orgDef ID="HYUNDAI" DisplayedName="Hyundai" Identifiers="Hyundai"
FullName="Hyundai Motor Company" OneSourceID="91815" />
    <orgDef ID="AICO" DisplayedName="Amcast" Identifiers="Amcast"
FullName="Amcast Industrial Corp" OneSourceID="1325" />
    <typeDef ID="steel" Identifiers="steel" FullName="steel"
EconomicCategory="commodity" DisplayedName="steel" />
    <typeDef ID="cars" Identifiers="\bcar\b | automobile" FullName="Cars /
Automobiles" EconomicCategory="" DisplayedName="cars" />
    <typeDef ID="glass" Identifiers="glass" FullName="glass"
EconomicCategory="commodity" DisplayedName="glass" />
    <typeDef ID="gg" Identifiers="greenhouse gas; global warming; kyoto treaty"
FullName="Greenhouse Gasses" EconomicCategory=""
DisplayedName="greenhouse" />
    <typeDef ID="gasoline" Identifiers="Gasoline; Crude oil; oil well"
FullName="Gasoline" EconomicCategory="" DisplayedName="gasoline" />
    <typeDef ID="motoroil" Identifiers="motor oil" FullName="Motor Oil"
EconomicCategory="" DisplayedName="motoroil" />
    <typeDef ID="smog" Identifiers="smog; air pollution; clean air"
```

TABLE 10-continued

```
FullName="Smog / air polution" EconomicCategory=""
DisplayedName="smog" />
    <typeDef ID="trucks" Identifiers="truck" FullName="Trucks"
EconomicCategory="" DisplayedName="trucks" />
    <typeDef ID="tires" Identifiers="tires; tire" FullName="tires"
EconomicCategory="" DisplayedName="tires" />
    <brandDef ID="Mustang" OneSourceID="0" Identifiers="" FullName=""
DisplayedName="Mustang" />
    <segmentDef ID="Male 35-45" OneSourceID="0" Identifiers="" FullName=""
DisplayedName="Male 35-45" />
    <segmentDef ID="Male" DisplayedName="Male" Identifiers="" FullName=""
OneSourceID="0" />
</entityDefs>
```

The XML definition shown in Table 9 specifies the list of entities in the environment model 130 and their attributes. The <orgDef> contains the definition of an Organization entity, the <typeDef> contains the definition of an ProductType entity, the <brandDef> contains the definition of an Brand entity, the <segmentDef> contains the definition of an ConsumerSegment entity, the <modelDef> contains the definition of a ProductModel entity, and the <personDef> contains the definition of an Person entity. By dividing entities into these entity types, the system 100 may specify different default relationships for each entity type. For instance, a Consumer Segment entity would generally not have a 'competitor' relationship with any other entity, but a Product Type or Organizational entity may. Furthermore, the distinction between entity types provides more flexibility when displaying events in the user interface 142, which may then display, as examples, events that involve people, or products, or organizations. For each of different kind of entity (i.e., Organization, Product Types, Brand, Consumer Segments, Product Models, and Person), the environment model 130 may specify an identifier (ID), a FullName, a DisplayName, and a list of Identifiers.

The Identifiers are the strings that event analysis system 100 searches for to recognize the entity when parsing through an article. For example, for Acme Motors, the identifiers may include "ACME" and "Acme Motors", both specify the same entity. The DisplayName field stores the value for the name which is displayed on the user interface 142, while FullName gives the proper full name of the entity. The ID (e.g., a stock symbol or a short form of the entity name) is the name by which the event analysis system 100 refers to the entity.

For Organization entities, the environment model 130 may also specify a OneSourceID attribute. This attribute may provide a numerical identifier for the organization which the event analysis system 100 may use to look up information in OneSource online business information (www.onesource.com). The event analysis system 100 may also define, for ProductType entities, an EconomicCategory attribute. This attribute may influence how the event analysis system 100 processes events involving different kinds of products and materials.

FIG. 4 illustrates an entity node 400 for Acme Motor Company, the ID 402 is "A" (the stock ticker for Acme). The OneSourceID 404 of 99999 allows the event analysis system 100 to connect to OneSource to find more information about Acme. The entity node 400 defines the identifiers 406 as "Acme Motor Company," "Acme," or "AcMoCo." The full name field 408 gives the full name "Acme Motor Company" and the displayed name field 410 specifies "Acme". For each entity, the event analysis system 100 may store (e.g., in an entity specific file, database entry, or other storage), a relationship entry for the entity. The ID field 402 may be used as an index or file identifier to locate the relationship entry in a database or in a file system.

The environment model 130 also defines relationships between entities. Table 11 shows an example of an entity relationship file for XYZ Motor, which is a competitor of Acme.

TABLE 11

```
<busNet>
    <CMNet>
        <focus>
            <organization ID="XYZ" OneSourceID="99999"
Identifiers="XYZ Motor Company; XYZ; XYZMoCo"
FullName="XYZ Motor Company" DisplayedName="XYZ" />
        </focus>
        <Suppliers>
            <product ID="steel" />
            <product ID="glass" />
            <product ID="tires" />
            <organization ID="DENSO" />
            <organization ID="TRW" />
            <organization ID="GT" />
            <organization ID="CTB" />
            <organization ID="VC" />
        </Suppliers>
        <Products>
            <product ID="cars" />
            <product ID="trucks" />
        </Products>
        <Byproducts>
            <product ID="smog" />
            <product ID="emissions" />
        </Byproducts>
        <Channels />
        <Competitors>
            <organization ID="Acme" />
            <organization ID="GM" />
            <organization ID="DCX" />
            <organization ID="TM" />
            <organization ID="HMC" />
            <organization ID="FIA" />
            <organization ID="NSANY" />
            <organization ID="PEUGY.PK" />
            <organization ID="VLKAY.PK" />
            <organization ID="CBA" />
            <organization ID="KIA" />
            <organization ID="BMW" />
            <organization ID="HYUNDAI" />
        </Competitors>
        <Substitutes />
        <Consumers />
        <Complements>
            <product ID="gasoline" />
            <product ID="motoroil" />
        </Complements>
        <Issues />
        <Subsidiaries>
            <organization ID="VOLVY" />
```

TABLE 11-continued

```
        <organization ID="JAGUAR" />
        <organization ID="MAZDA" />
    </Subsidiaries>
    <ParentCompany />
    </CMNet>
</busNet>
```

The busNet and CMNet nodes are reserved for future expansion, and FIG. 4 (in conjunction with Table 11) shows the configuration of an entity relationship 412. The focus node 414 verifies that the content of the relationship entity file is for XYZ Motor Company (and not some other entity). The remainder of the relationship entity file is subdivided by relationship type. Examples are shown in Table 11; any other relationships may be defined and established in the relationship entity file. FIG. 4 shows that the entity relationship 412 may define relationships of other entities, places, or things to Acme using a Suppliers field 416 (e.g., "steel"), Products field 418 (e.g., "cars"), ByProducts field 420 (e.g., "emissions"), Competitors field 422 (e.g., "ABC motor"), Substitutes field 424, Consumers field 426, Complements field 428 (e.g., "gasoline"), Issues field 430, Subsidiaries field 432 (e.g., "Volvo", "Jaguar", and "Mazda"), and Parent company field 434.

In the examples shown in Table 11, each relationship section is populated with the IDs of the entities that fulfill that relationship. For example, Table 11 establishes that Acme has three defined subsidiaries, Volvo, Jaguar, and Mazda. In other words, Acme is related to Volvo, Jaguar, and Mazda by the relationship of parent to subsidiary. As another example, the entity relationship establishes Acme as a competitor to XYZ using the Competitors field. The event analysis system 100 may employ the IDs as a database key, search term, or filename to navigate through the model 130 and to locate additional information about the entities. For example, knowing that XYZ Motor is a competitor of Acme Motor, the event analysis system may then open a file keyed off of the ID (e.g., "XYZ.xml") to determine XYZ's suppliers.

The event analysis system 100 uses the event implication model 132 to determine when certain types of events with particular attributes signal the possibility of other events occurring in the future. As one example, if a CEO of a competitor is recruited to head another competitor, it is reasonable to infer that there is an increased chance of the two competitors merging, sharing technology, or otherwise working together. The event implication model 132 establishes rules for making the inferences.

As an overview, the event analysis system 100 adds messages to events. The messages explain that an inference can be made from the event, and/or describe the inference. In addition, the event analysis system 100 creates new detected events which the event analysis system 100 may display along with events directly determined from an original article. Furthermore, the event analysis system 100 may inject the inferred events back into the implication processing flow so that the inferred event may generate additional detected events.

The event implication engine 138 matches trigger events to possible implications defined in the implication models 132. An example of an implication model 132 is shown below in Table 12.

TABLE 12

```
<ThreatAndOpportunityModel>
  <ThreatAndOpportunityItem item="IF company hires new CFO THEN possible merger">
    <Constraints>
      <EventConstraint eventType="Recruit">
        <AttributeConstraints>
          <AttributeConstraint name="New Position" type="Match">
            <Value>CFO</Value>
            <Value>Chief Financial Officer</Value>
            <Value>C.F.O.</Value>
          </AttributeConstraint>
          <AttributeConstraint name="Previous Employer" type="NonEmpty" />
          <AttributeConstraint name="Organization" type="NonEmpty" />
        </AttributeConstraints>
      </EventConstraint>
    </Constraints>
    <Implications>
      <ImplicationMessage>$Organization may be interested in purchasing $Previous_Employer.</ImplicationMessage>
      <ImpliedEvent eventType="Merger">
        <Attributes>
          <Attribute name="Acquirer" value="$Organization" />
          <Attribute name="Price" value="Unknown" />
          <Attribute name="Organizations" value="Unknown" />
          <Attribute name="Organization" value="$Previous Employer" />
          <Attribute name="Date" value="Unknown" />
          <Attribute name="Time" value="1 year" />
          <Attribute name="Tense" value="Unknown" />
          <Attribute name="Confidence" value="Unknown" />
        </Attributes>
      </ImpliedEvent>
    </Implications>
  </ThreatAndOpportunityItem>
  <ThreatAndOpportunityItem item="IF competitor changes price THE change in demand">
    <Constraints>
      <EventConstraint eventType=" Price Change">
        <AttributeConstraints>
          <AttributeConstraint name="Company" type="Relationship">
            <Origin>$FOCUS</Origin>
            <Value>competitors</Value>
          </AttributeConstraint>
        </AttributeConstraints>
      </EventConstraint>
    </Constraints>
    <Implications>
      <ImplicationMessage>$FOCUS may experience a change in product demand.</ImplicationMessage>
      <ImpliedEvent eventType="Update">
        <Attributes>
          <Attribute name="Feature Change" value="change in demand" />
          <Attribute name="Company" value="Unknown" />
          <Attribute name="Products" value="Unknown" />
          <Attribute name="Date" value="Unknown" />
          <Attribute name="Time" value="Unknown" />
          <Attribute name="Tense" value="Unknown" />
          <Attribute name="Confidence" value="Unknown" />
        </Attributes>
      </ImpliedEvent>
    </Implications>
  </ThreatAndOpportunityItem>
  <ThreatAndOpportunityItem item="IF company's supplier changes prices THEN company may change product price">
    <Constraints>
      <EventConstraint eventType="Price Change">
        <AttributeConstraints>
          <AttributeConstraint name="Company" type="Relationship">
            <Origin>$FILL_Company_IS_supplier</Origin>
            <Value>supplier</Value>
          </AttributeConstraint>
        </AttributeConstraints>
      </EventConstraint>
    </Constraints>
    <Implications>
      <ImplicationMessage>$Company product price change (supplier) may cause $FILL_Company_IS_supplier to change product price.</ImplicationMessage>
      <ImpliedEvent eventType="Price Change">
```

TABLE 12-continued

```
    <Attributes>
        <Attribute name="Old Price" value="Unknown" />
        <Attribute name="New Price" value="Unknown" />
        <Attribute name="Company"
            value="$FILL_Company_IS_supplier" />
        <Attribute name="Products" value="Unknown" />
        <Attribute name="Time" value="$Time" />
        <Attribute name="Tense" value="Unknown" />
        <Attribute name="Confidence" value="Unknown" />
    </Attributes>
  </ImpliedEvent>
 </Implications>
</ThreatAndOpportunityItem>
</ThreatAndOpportunityModel>
```

Figure 5:
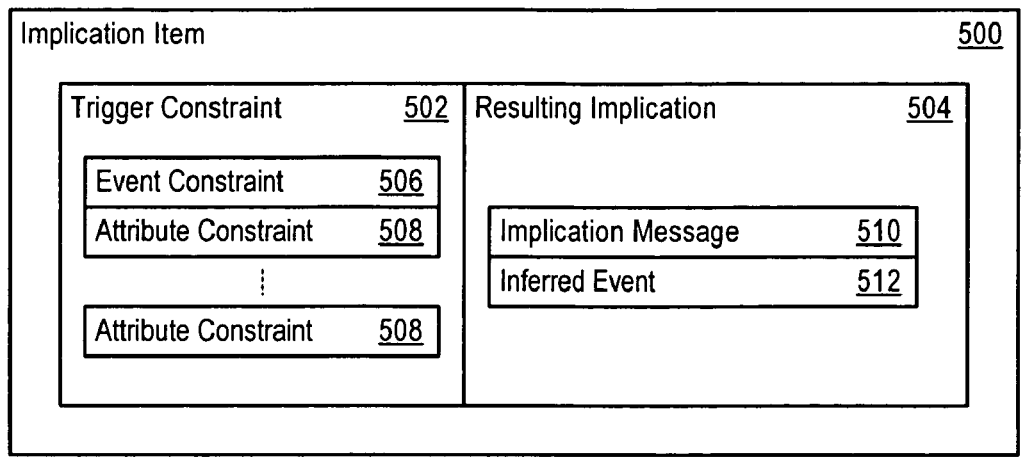
FIG. 5 illustrates an implication item including a trigger constraint and a resulting implication.

The event implication model 132 defines individual implication items, shown in FIG. 5, each tagged with a 'ThreatAndOpportunityItem' tag. The implication items 500 establish one or more trigger constraints 502 for the triggering event to meet, and a resulting implication 504 which holds when the constraints were met. The trigger constraints 502 may be established as an event constraint 506 and one or more attribute constraints 508 for that event. The event constraint 506 searches for a match on the event type.

The implication items 500 may distinguish between multiple different types of attribute constraints 508. One example is an 'Optional' attribute constraint. The optional attribute constraint signifies that the value of the attribute is not pivotal and may even be unknown or undefined. Optional attributes may be included so that the implications may refer to the attribute by name.

A second example is 'NonEmpty'. The nonempty attribute constraint signifies that the event extraction process has returned a value for the attribute. The specific value is not pivotal.

A third example is 'Match'. The match attribute constraint signifies that the extracted value for the attribute matches a listed value. There may be multiple listed values which can match the extracted value.

A fourth example is 'Relationship'. The relationship attribute constraint signifies that the extracted value for the attribute conforms to a relationship defined in the environment model 130. The extracted value serves as a target for the relationship, and the origin of the relationship is listed in the constraint. The origin of the relationship may refer to another attribute of the event.

The origin may include special parameters, such as "focus" and "fill" parameters. One example is: $FOCUS. The $FOCUS parameter specifies that the origin will be the focus entity of the application. For a particular relationship attribute constraint, the system 100 may define both parties in the relationship. For some event types, there may not be an attribute to define both parties. For example, in the event type definition of the Hire event, there may not be both of the companies defined as attributes. Instead, there may only be the company that is involved in the hiring. Nevertheless, the system 100 may then "lookup" the competitor relationship by specifying that the hiring company is the FOCUS. The system 100 may then check detected hire events, and when the company involved in the hiring event is a competitor to the FOCUS, the system 100 may make a match. For example, the FOCUS may be defined as Acme Motors, Inc. A particular hire event at XYZ Motors may not mention Acme, but the FOCUS entity lets the system 100 make the connection, since XYZ is a competitor of Acme. A second example is $FILL_<entity>_IS_<relationship>. This parameter specifies that the event analysis system 100 will fill in the entity from the environment model 130. Generally, the system 100 will generate one inferred event for a triggering threat event. With the FILL functionality, however, the system 100 may generate multiple inferred events from a single triggering threat event. For example, assume an event involving company SupplierX which may have implications for several other companies (namely, for each company which has a supplier relationship with SupplierX). The system 100 may use the FILL functionality to look at the relationship model and pick out each entity that has the supplier relationship with SupplierX. Then the system 100 may generate inferred event for each of those companies.

The resulting implication 504 is the second part of each implication item 500. The resulting implication 504 specifies an action to take when the attribute constraints are met. Each resulting implication 504 may specify an implication message 510 and an implication event 512.

The implication message 510 may be implemented as a string (e.g., a human readable text string) that the event analysis system 100 stores in the event object for the inferred event and outputs through the user interface when there is an event match. The string may embed variables, which may specify the named attributes from the attribute constraints 508 in the trigger constraint portion 502. In addition, the "focus" and "fill" parameters may provide variables for the implication message 510.

The inferred event 512 specifies an output event which may enter the event stream, according to the format described above for events. Thus, the inferred event objects may be saved in the event database 112, and subject to further implication as well. The implication item 500 specifies the event type for the output event and the attributes for the event. Any attribute may be left empty, may be set to a specific value, or may be filled using the attribute variable described above.

Figure 6:
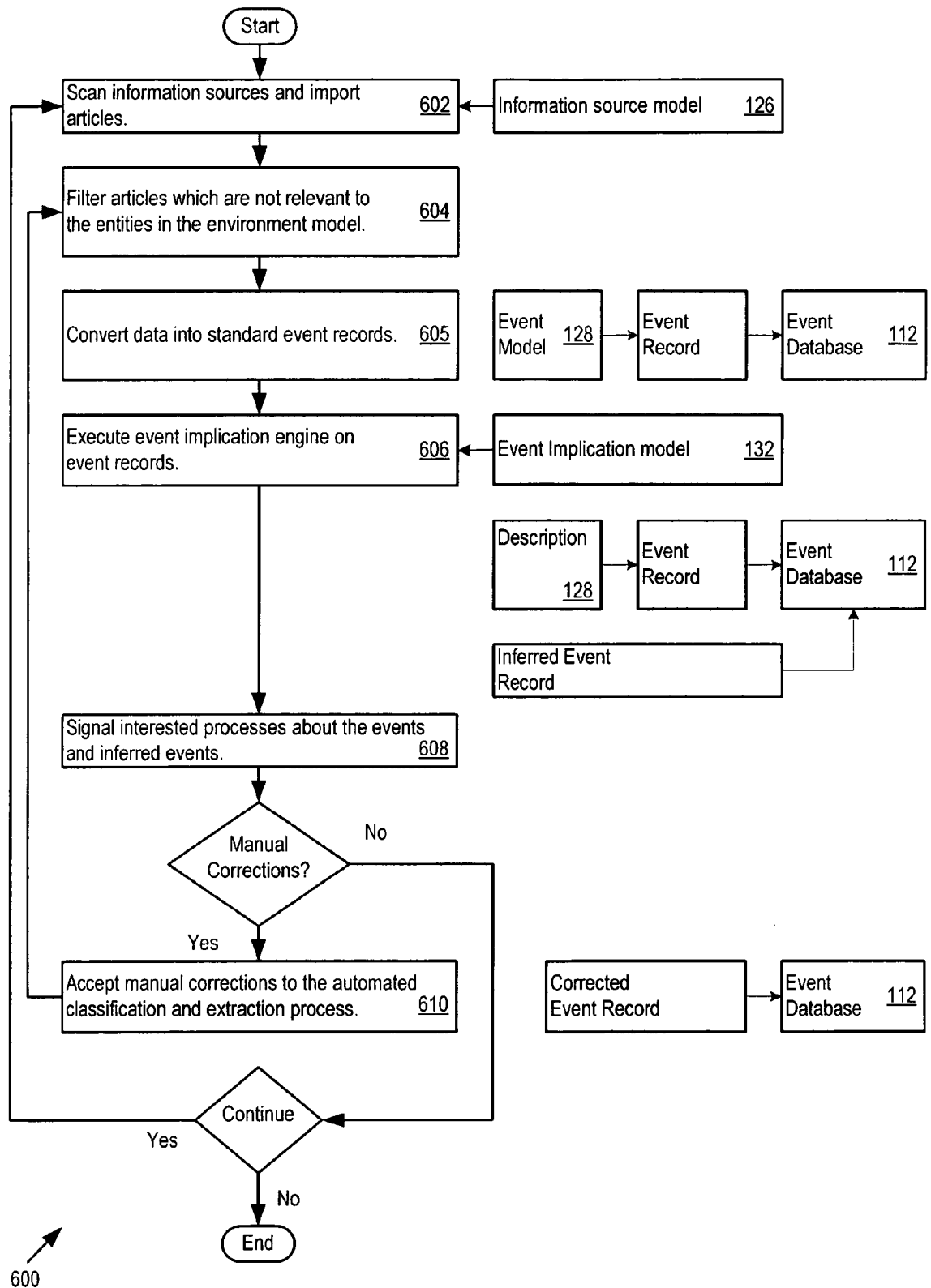
FIG. 6 shows the acts which the event analysis system may take to detect and infer events.

FIG. 6 presents an example of the acts 600 which the event processing control program 148 may take to coordinate the processing of the event analysis system 100. The event processing control program 148 scans the information sources 116 and retrieves new articles (Act 602). The event processing control program 148 filters (e.g., removes) articles which are not relevant to the entities defined in the environment model 130 (Act 604). As a result, the analysis system 100 eliminates a significant percentage (e.g., 99% or more) of retrieved information prior to applying the event detection engine on the new articles. The event processing control program 148 initiates execution of the event detection engine 136 on the retained articles. The event detection engine 136 processes each article according to the source and type of data (e.g., text) in the article. The event detection engine 136 produces an event record according to the event model 128 for the events defined in the article, including event type, event attributes, event importance or priority, the source article which describes the event, an address for the article, and referenced organizations, and any other extracted event information (Act 605). Prior to performing event implication, additional filtering may be performed to retain those events which reference entities defined in the environment model 130. In addition, the event detection engine 136 may output information specific to the type of data in which the event was detected. As one example, when the article is a text article, the output of the conversion engine may include a tokenized or parsed version of the text article.

The event processing control program 148 also initiates execution of the event implication engine 138 on the event records (Act 606). The implication engine 138 produces a description of an implied event which is added to the original event record. The implication engine 138 also generates a new event record for an inferred event.

The event processing control program 148 may signal other entities that newly detected events and inferred events exist (Act 608). The entities may be processes which consume and display events on a graphical user interface, for example. The event analysis system 100 may employ a message publication/subscription engine, web services, direct messaging or signaling, email, file transfer, or other communication techniques to notify other entities. The event analysis system 100 may thereby create a stream of events (e.g., a stream of event object data) in a form for consumption by client applications. The stream may include each event detected, or may include subsets of detected events, as specified or requested by the client application.

In addition, the event processing control program 148 may query for and accept manual corrections to any of the automated event detection processing (Act 610). For example, the event analysis system 100 may accept a correction to a time, date, or place where an event occurred from the user interface 142. The event analysis system 100 may then update the event database 112 with the corrected event, and re-apply the implication engine 138 to the corrected event. (Note that we can have manual corrections to the attributes of an event (date, time, place, etc., like you mention), but also to the event type itself. For example, something that is actually a Hire event may be incorrectly machine classified as a Joint Venture event. Accordingly, manual corrections may also apply to the event type itself, and an operator may, for example, change a Joint Venture event to a Hire event, or may make any other change to an event classification.

FIG. 7 shows an event object 700 which the event analysis system 100 may create, save in the event database 112, and update as a new article is processed. The event object 700 may include a title field 702, which stores a title associated with the article; a link field 704, which stores a link (e.g., a url link) which specifies where the article may be found; and a description field 706, which stores a description of the event. In addition, the event object 700 may include a source type field 708, which identifies the type of source from which the article was obtained; an entity identifier field 710 which stores an identifier of an entity involved in the event; and an event type field 712, which stores an identifier of the type of event represented in the article. Different, fewer, or additional fields may be provided in any particular implementation. As examples, the additional fields may specify full article text, numerical data, or other data.

The event object 700 also includes an event type probability field 714, which identifies how certain the event analysis system 100 is that the event occurred; an importance field 716, which specifies how important the event is; and a public interest field 718, which specifies the level of public interest in the event. The event object 700 further includes a tokenized title 720, which stores the title of the article broken down into tokens; a tokenized description 722, which stores the description of the article broken down into tokens; and attribute fields such as an attribute list 724, which holds the attribute values for the event represented by the event object. The event object 700 may also include an implication message list 726, which stores messages returned by the implication process; and an extracted entities list 728, which stores identifiers of entities involved in the event.

The fields shown in FIG. 7 are examples only. The event object 700 may include additional, fewer, or different fields.

Figure 8:
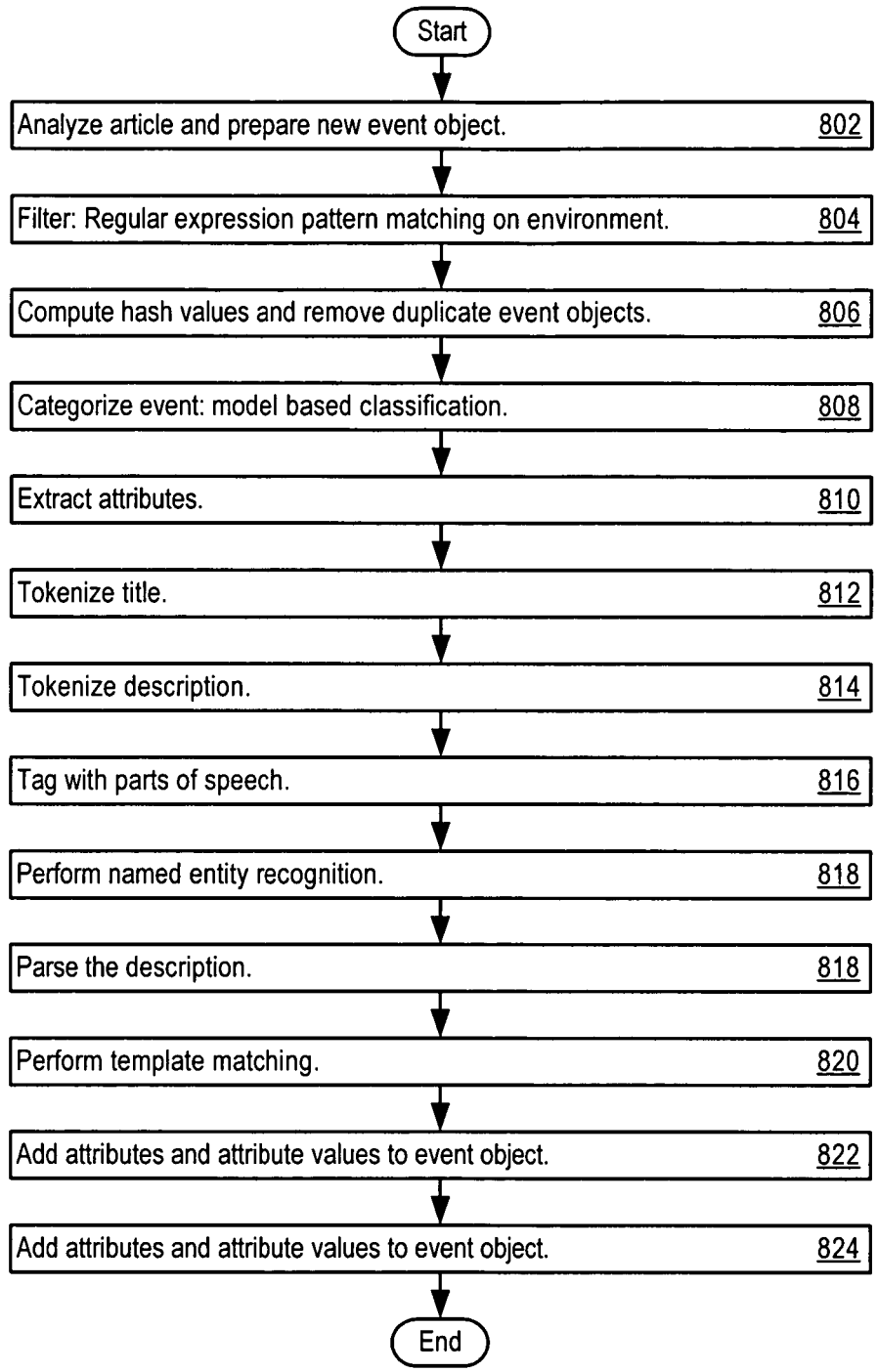
FIG. 8 shows an example of the acts which an event detection engine may take to detect an event in an article.

FIG. 8 shows an example of the acts 800 which the event detection engine 136 may take. The event detection engine 136 analyzes each article and responsively prepares a new event object 700. An example of the processing is given below, assuming an article received from an RSS information source 116 illustrated in Table 13.

TABLE 13

```
<item>
    <title>ACME Cutting Jobs</title>
    <link>http://us.rd.abcnewspaper.com/dailynews/rss/business/
20051121/autos/Acme01.html</link>
    <description> ACME Motors Corp. said on Monday it would cut
5,000 manufacturing jobs and close two plants in Asia as it struggles
to compete with XYZ Motors.</description>
    <author></author>
    <pubDate>11/21/2005 2:44 PM</pubDate>
    <comments> </comments>
    <read>False</read>
    <date>11/21/2005 5:22 PM</date>
    <importance>0</importance>
</item>
```

The event detection engine 136 parses the article and extracts the title, link, description, and source type information by locating the corresponding xml tags in the article (Act 802). The event detection engine 136 then completes the title field 702, link field 704, description field 706, and source type field 708. Table 14 shows the newly created event object.

TABLE 14 businessEvent class
title = ACME Cutting Jobs (Reuters)
link = http://us.rd.abcnewspaper.com/dailynews/rss/business/20051121/autos/Acme01.html
description = ACME Motors Corp. said on Monday it would cut 5,000 manufacturing jobs and close two plants in Asia as it struggles to compete with XYZ Motors..
sourceType = RSS The event detection engine 136 then filters the events generated by the initial analysis phase (Act 804). In particular, the event detection engine 136 retains those event objects which include an entity defined in the environment model 130 (e.g., Acme motor company) and that does not include any exclusion phrases (e.g., "Acme modeling agency") which may also be defined in the event model 130. The event detection engine 136 may perform regular expression pattern matching to search the event object (e.g., the description field 706) for entities defined in the environment model 130. Accordingly, the event detection engine 136 applies a filter to the articles received from the information sources 116. Specifically, the event detection engine 136 retains those articles and corresponding event objects which are relevant to the entities defined in the environment model 130.

During the filtering process, the pattern matching process identifies entities in the event object which are defined in the environment model 130. As a result, the event detection engine 136 may set the entity identifier field 710 to an entity identifier (e.g., "Acme") located in the description field 706 (i.e., entityID="Acme"). The system 100 may assign the entityID for an event to the first entity found in that event. For example, an event created by the text "Acme and XYZ Motors to merge" may have only Acme as its entityID. In an alternate embodiment, the system 100 may implement each event's entity field as a list including each entity discovered in the article (e.g., a list with two members: Acme and XYZ).

Next, the event detection engine 136 removes duplicate event objects (Act 806). Because an article may appear multiple times across multiple dates from multiple RSS feeds, the same article may create multiple duplicate event objects. The event detection engine 136 may eliminate duplicates by computing a hash value based on the fields of the event object (e.g., the title and description fields). The hash function may be the SHA-1 hash function, or another function which converts a string into a fixed-length (hexadecimal) number. The event detection engine 136 determines that an event object is a duplicate when hash values collide. In one implementation, each duplicate event object is removed, leaving one event object which captures the event.

The event detection engine 136 continues by classifying an event represented in the event object (Act 808). In one implementation, the event detection engine 136 may apply a classification algorithm to the description field 706. The classification algorithm may determine, given the description, whether the description belongs to a specified class (e.g., a particular event defined in the event model 128). The classification algorithm may implement, for example, the naive Bayes algorithm for document classification. The classification algorithm may be implemented with the opensource Rainbow classification engine, or any other classification engine.

The classification algorithm may provide not only the classification of the event, but also the reliability or probability of a correct classification. Thus, the classification algorithm may provide information for the event type field 712 and the event type probability field 714. As examples: eventType='workforce size change' and eventTypeProbabilty=0.99.

The event detection engine 136 also applies an attribute extraction program to extract attributes for the event (e.g., obtained from the description field 706) (Act 810). The extracted attributes build the attribute list 724. In one implementation, the event detection engine 136 tokenizes the title (Act 812) and tokenizes the description (Act 814) as part of the attribute extraction process.

To that end, a tokenizing engine breaks the title and event description into a tokenized description, including words, numbers, punctuation, and/or other tokens, and adds the tokens to the tokenized title 720 and tokenized description 722. A natural language processing engine may perform the tokenizing operation. As an example, the natural language processing engine may be the opensource Natural Language Tool Kit (NLTK). In addition, a tagging engine may assign a part-of-speech tag to each token in the tokenized representations (At 816) to provide a tagged tokenized description. The NLTK may implement the tagging engine.

The event detection engine 136 also performs named entity recognition (Act 818). In that regard, a named entity recognition engine accepts as input an event object (e.g., including a tokenized tagged description) and performs named entity recognition on the text included in the event object. As examples, the named entity recognition engine may identify personal names, company names, or geographical locations within the text. The named entity recognition engine adds information tags to the event object which describe which named entities exist and where they are located to the event object. In one implementation, the named entity recognition engine may be the ClearForest engine available from Clear-Forest Corp. of Waltham, Mass.

A parsing engine, which takes as input an event object, identifies the grammatical structure of the text (Act 818). For example, the parsing engine may identify noun phrases, verb phrases, or other grammatical structure within a sentence. The parsing engine adds grammatical structure tags to identify the detected structures and identifies which words make up the structures. The tags are added to the event object 700.

The parsing engine may be implemented with a statistical natural language parser, such as the Collins parser.

Next, the event detection engine 136 performs template matching (Act 820). The event detection engine 136 may process an event object and determine a matching event type in the event model 128. The matching event type defines the attributes for the event. The template matching may then add each attribute and a detected value for the attribute to the event object (Act 822). In one implementation, the system 100 performs template filling as described next. Assume that the system 100 has already identified all instances of all data types within the event text, where the data types may be a pre-defined "class" of words or terms. For instance, "person" is a data type, and "John Doe" is an instance of the "person" data type. Other examples of data types include date, company name, and job title.

Assume also that preMarkers and postMarkers for all event types have been identified. These markers are phrases that are defined in the business event model 128, and indicate possible positions of event attribute values.

The system 100 then examines the event model 128 to determine what attributes the system 100 should search for, for each event, based on each event's event type. For instance, if the event has been classified as belonging to the "Hire" event type, then the system 100 may search for five attributes: person, new employer, previous employer, new job title, and the date that the hire becomes effective.

The event model 128 specifies what data type each of these attributes will have. As examples, the person attribute will be filled with a value that belongs to the person data type, and the new employer and previous employer attributes will be filled with values that belong to the company name data type.

For each attribute, the system 100 determines whether it has identified any instances of the data type associated with that attribute. For instance, if the system 100 is searching to find the value for the "New Employer" attribute, the system 100 determines if it has identified any instances of the "company" data type. If the system 100 has identified 0 instances of that data type, the system assigns the value 'unknown'.

If the system 100 has identified one instance of that data type, the system 100 checks whether that instance has already been determined to be the value of a different attribute. If so, the system 100 assigns the value 'unknown'. If the instance has not been used for another attribute, the system 100 may assume that that instance is the value for our current attribute, and the system 100 may assign the value to the current attribute. If the system 100 has identified more than one instance of the right kind of data type, then the system 100 determines whether there are any preMarkers that fall immediately before an instance of the data type, or if there are any postMarkers that fall immediately after an instance of the data type. For example, the phrase "will be joining" may be a preMarker for the "New Employer" attribute. Thus, if an instance of the "company name" data type comes immediately after the phrase "will be joining" in the event text, the system 100 may assume that that instance is the value for the "New Employer" attribute. Similarly, if "will join" is a postMarker for the "Person" attribute, and if the system 100 sees an instance of the "Person" data type followed by the phrase "will join", the system 100 may assume that that instance of the "Person" data type is the value for the "Person" attribute. Thus, the term "Person" is used both as a data type and as an attribute name. If the system 100 does not find any cases of an instance of the right data type either preceded by a preMarker or followed by a postMarker, then the system 100 may assign the value of 'unknown'.

Table 15 shows an event object, continuing the example above, processed through the template matching phase.

TABLE 15

```
businessEvent class
title = ACME Cutting Jobs (Reuters)
link =
http://us.rd.abcnewspaper.com/dailynews/rss/business/20051121/autos/
Acme01.html
description = ACME Motors Corp. said on Monday it would cut 5,000
manufacturing jobs and close two plants in Asia as it struggles to compete
with XYZ Motors..
sourceType = RSS
entityId = ACME
eventType = Workforce size change
eventTypeProbability = .99
tokenizedTitle = <list of tokens in title>
tokenizedDescription = <list of tokens in description>
attributes =    {
                Company: Acme Motors
                Labor Organization: Unknown
                Number Affected: 5,000
                Location: Asia
                Reason: "struggles to compete"
                Date: 11-21-2005
                Time: Unknown
                Tense: Report
                Confidence: Unknown
                }
extractedEntities = <list (dictionary) of extracted entities >
```

Optionally, the event analysis system 100 determines and assigns importance and/or public interest levels (e.g., from 1 to 5) to the detected event (Act 824). The buzz and sentiment engines 140 may provide estimates of the importance and public interest levels. The buzz and sentiment engines 140 may be provided by the Sentiment Monitoring System or Online Analysis System available from Accenture Technology Labs of Chicago Ill. Alternatively, the event analysis system 100 may communicate with an external system which performs the analysis of importance or public interest and returns the importance or public interest level, given event objects which the event analysis system 100 sends to the external system. The event analysis system 100 may thereby receive the importance and public interest levels from the external system and accordingly populate the event object in the event database 112. In determining the importance level and public interest level, the buzz and sentiment engines 140 may consider factors such as organization size, event likelihood, number of articles reporting the same event, length of article, amount of money or personnel at issue, or other factors.

Figure 9:
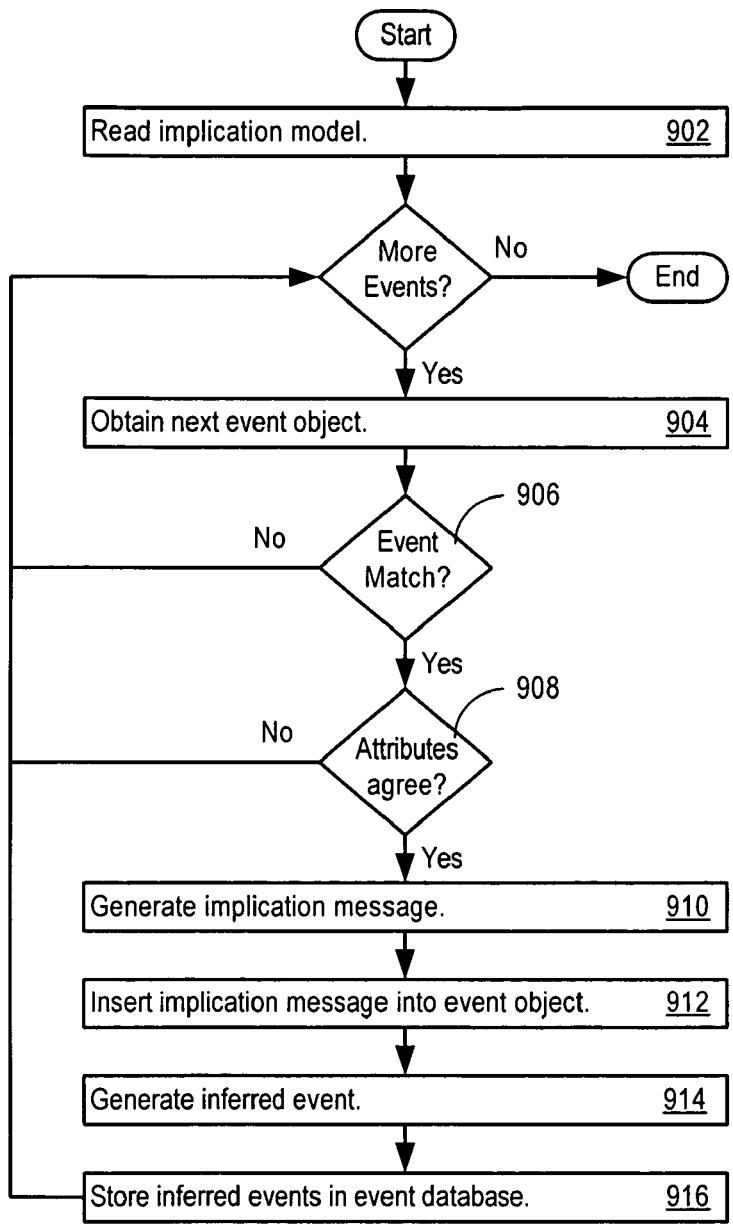
FIG. 9 shows an example of the acts which an event implication engine may take to infer new events from detected events.

FIG. 9 shows an example of the acts which the event implication engine 138 may take to interpret events, starting with an input of a list of event objects. The implication engine 138 reads the implication model 138 (Act 902). The implication engine 138 thereby obtains a list of the implication items, trigger constraints, and resulting implications stored in the implication model 138.

The event implication engine 138 obtains the next event object from the list of event objects (Act 904) and searches for a match. To that end, the event implication engine 138 searches for a match between the event type defined in the event type field 712 of the event object and the event type specified in the event constraints 506 of the trigger constraints 502.

If the event type matches, then the event implication engine 138 also searches for a match to the attribute constraints 508 in the attribute list 724 (Act 908). When the event type and attributes match, the event implication engine 138 activates the resulting implications 504. For example, the event implication engine 138 may generate an implication message (Act 910) and then insert the implication message into the event object which triggered the implication (Act 912). In addition, the implication engine 138 generates one or more inferred events flowing from the matched trigger constraint 502 (Act 914). The inferred events give rise to new event objects which are inserted into the event database 112. Thus, a single originally detected event may result in many inferred events, as each new inferred event is processed by the implication engine, established as a new event object, stored in the event database 112, and processed by the implication engine.

In the process of matching attributes, the event implication engine 138 creates a temporary variable list, and creates an attribute variable for each attribute named in the constraints. In addition, the event implication engine 138 creates the focus and fill variables as they are encountered. The focus and fill variables are bound with the actual attribute values from the triggering event (or from the entity-relationship model for the fill variables). Thus, the event implication engine 138 may use the variables in the implications analysis, having bound the variable values in the constraints analysis.

Table 16 shows detailed pseudo-code for the event implication engine 138.

TABLE 16

```
(Input: event list)
read interpretation model
create empty impliedEvents list
for each trigger event in event list:
    for each implication item in implication model:
        if trigger event type matches implication item event type:
            eventMatch = True
            create empty attributes variable dictionary
            create empty fill variables dictionary
            for each constraint in implication item:
                get event attribute value for this constraint item
                if constraint type = "NonEmpty":
                    if event attribute value is unknown:
                        eventMatch = False
                    else:
                        insert attribute-value pair into attribute variable dictionary
                if constraint type = "Optional":
                    insert attribute-value pair into attribute variable dictionary
                if constraint type = "Match":
                    if event attribute value does not match one of the listed values:
                        eventMatch = False
                    else:
                        insert attribute-value pair into attribute variable dictionary
                if constraint type = "Relationship":
                    if origin is not "fill" type:
                        get origin and relationship from implication item
                        lookup origin-target relationship in entity-relationship
                        model
                        if relationship does not exist:
                            eventMatch = False
                        else:
                            insert attribute-value pair into attribute variable
                            dictionary
                    if origin is "fill" type:
                        lookup all possible relationship origins for given target and
                        relationship
                        if no results:
                            eventMatch = False
                        else:
                            insert values into fill variables dictionary
            if eventMatch = True:
                generate implication message, populating variables from variable
                dictionaries
                insert implication message string into original trigger event
                create generated event list with one event
                fill out non-attribute event info
                for each attribute in implication event:
                    if value is not "fill" type:
                        if value is a variable:
                            look up in variable dictionary
```

TABLE 16-continued

```
    else:
        use string as written in model
        set corresponding attribute for each event in generated event
list
    if value is "fill" type:
    create empty temp event list
    for each event in generated event list:
        for each entry in fill variable list in fill variable dictionary:
            create event copy
            set corresponding attribute to fill entry
            append new event copy to temp event list
        replace generated event list with temp event list
    append items in generated event list to main impliedEvents list
insert impliedEvents back into original event list
```

The event analysis system 100 also facilitates the display of events, including inferred events. To that end, the event analysis system 100 may produce output files which drive the display of events on the user interface 142, or which the event portal 122 may use to display event and event information on the portal user interface 124.

Figure 10:
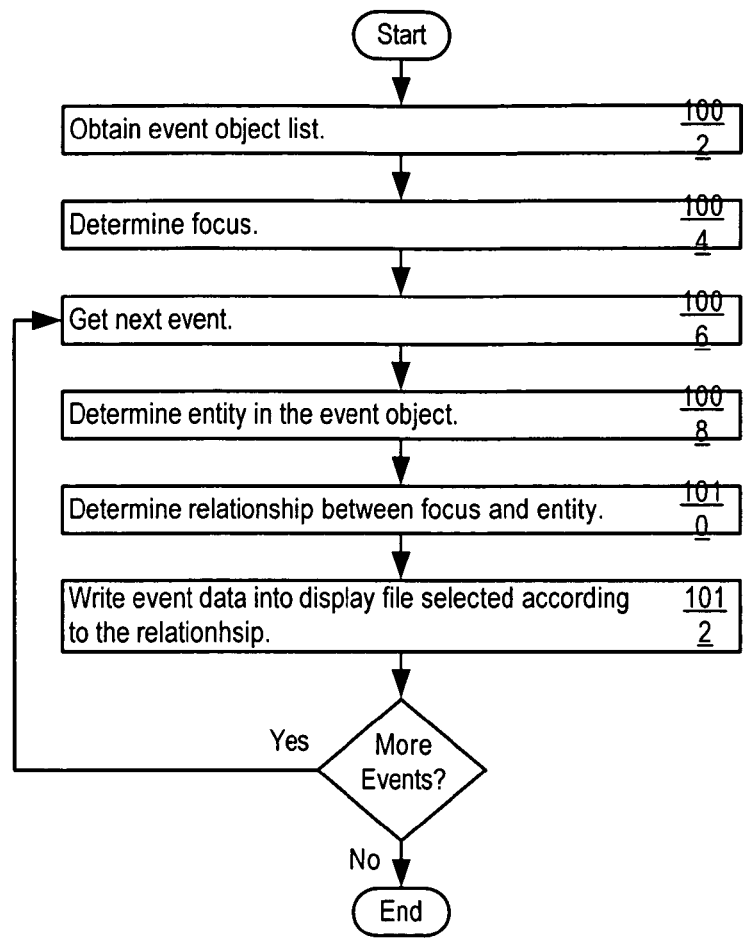
FIG. 10 illustrates an example of the acts which an event display preparation engine may take to create output files.

FIG. 10 shows an example of the acts which the event display preparation engine 146 may take to create the output files. The event display preparation engine 146 obtains the list of event objects, including each event detected by the event detection engine 136 and the inferred events determined by the event implication engine 138 (Act 1002). The event display preparation engine 146 writes the contents of the event objects in the list to specific XML display files. In other implementations, however, the event display preparation engine 146 writes the contents of the event objects into database tables and fields organized, for example, by entity relationship type for further processing by the rendering engine 144 or event portal 122.

In one implementation, the event display preparation engine 146 adds the contents of the event objects to specific XML display files created for each relationship type established in the environment model 130. As examples, there may be an XML display file for Competitors, Suppliers, Products, Consumers, Subsidiaries, or any other defined relationship. The event analysis system 100 particular display file chosen to hold the event data depends on the relationship between the event entity and the focus.

The focus entity is the entity on behalf of which the event analysis system 100 detects and infers events. For example, the focus may be XYZ motors, a competitor of Acme motors. The event analysis system 100 may then detect, infer, and display events as they affect XYZ motors. The focus may be set before event detection and implication occurs. In other implementations, the focus may be selected through the user interface 142, and the processing system 100 will initiate the corresponding changes to the reports generated on the display 106 or communicated through the event portal 122.

Accordingly, the display preparation engine 146 determines the focus (Act 1004), obtains the next event object in the event object list (Act 1006), and determines the entity specified in the event object (Act 1008). Knowing the focus and the event entity, the display preparation engine 146 may determine the relationship between the focus and the event entity (Act 1010). To that end, the display preparation engine 146 may search the environment model 130 for an entity relationship between the focus and the event entity. In the example above, Table 11 defined the environment for XYZ Motor Company. In particular, the environment established a Competitors relationship between XYZ and Acme. More generally, the display preparation engine 146 determines the relationship between the focus and the event entity by searching the environment model 130 (Act 1010).

As a result, the display preparation engine 146 identifies the specific XML display file in which to write the event data. In the example above, the XML display file is the Competitors display file. The display preparation engine 146 writes the event data from the event object into the display file (Act 1012). Specifically, the display preparation engine 146 may save the event type, source type, link, description, entity identifier and name, entity attribute names and values, implications and any other event data in the display file.

Table 17 shows an example of the contents of the display file, continuing the example above regarding the layoffs at Acme Motor Company.

TABLE 17

```
<event eventType="Labor relations: Workforce size change">
    <sourceInfo sourceType="RSS">
        <title> ACME Cutting Jobs (Reuters)</title>
        <link>
    http://us.rd.abcnewspaper.com/dailynews/rss/business/20051121/
autos/Acme01.html
        </link>
        <description>Reuters - ACME Motors Corp. said on Monday it
would cut 5,000 manufacturing jobs and close a two plants in Asia as it
struggles to compete with XYZ Motors..</description>
    </sourceInfo>
    <entityIds>
        <entityId>Acme</entityId>
    </entityIds>
    <entityDisplayName>Acme Motors</entityDisplayName>
    <generalAttributes>
        <importance>5</importance>
        <publicInterestLevel>4</publicInterestLevel>
    </generalAttributes>
    <typeSpecificAttributes>
        <attribute name="Company" value="Acme Motors"
detail="True" summary="True" />
        <attribute name="Labor Organization" value="Unknown"
detail="True" summary="True" />
        <attribute name="Number Affected" value="5,000"
detail="True" summary="True" />
        <attribute name="Location" value="Asia" detail="True"
summary="True" />
        <attribute name="Reason" value="struggles to compete"
detail="True" summary="True" />
        <attribute name="Date" value="11-21-2005" detail="True"
summary="True" />
        <attribute name="Time" value="Unknown" detail="True"
summary="True" />
        <attribute name="Tense" value="Report" detail="True"
summary="True" />
        <attribute name="Confidence" value="Unknown" detail="True"
summary="True" />
    </typeSpecificAttributes>
    <implications>
        <implication>Possible reduction in Acme's production costs (0
other signals of this implication detected).</implication>
        <implication>Possible reduction in Acme's production capacity
(0 other signals of this implication detected).</implication>
    </implications>
</event>
```

Figure 11:
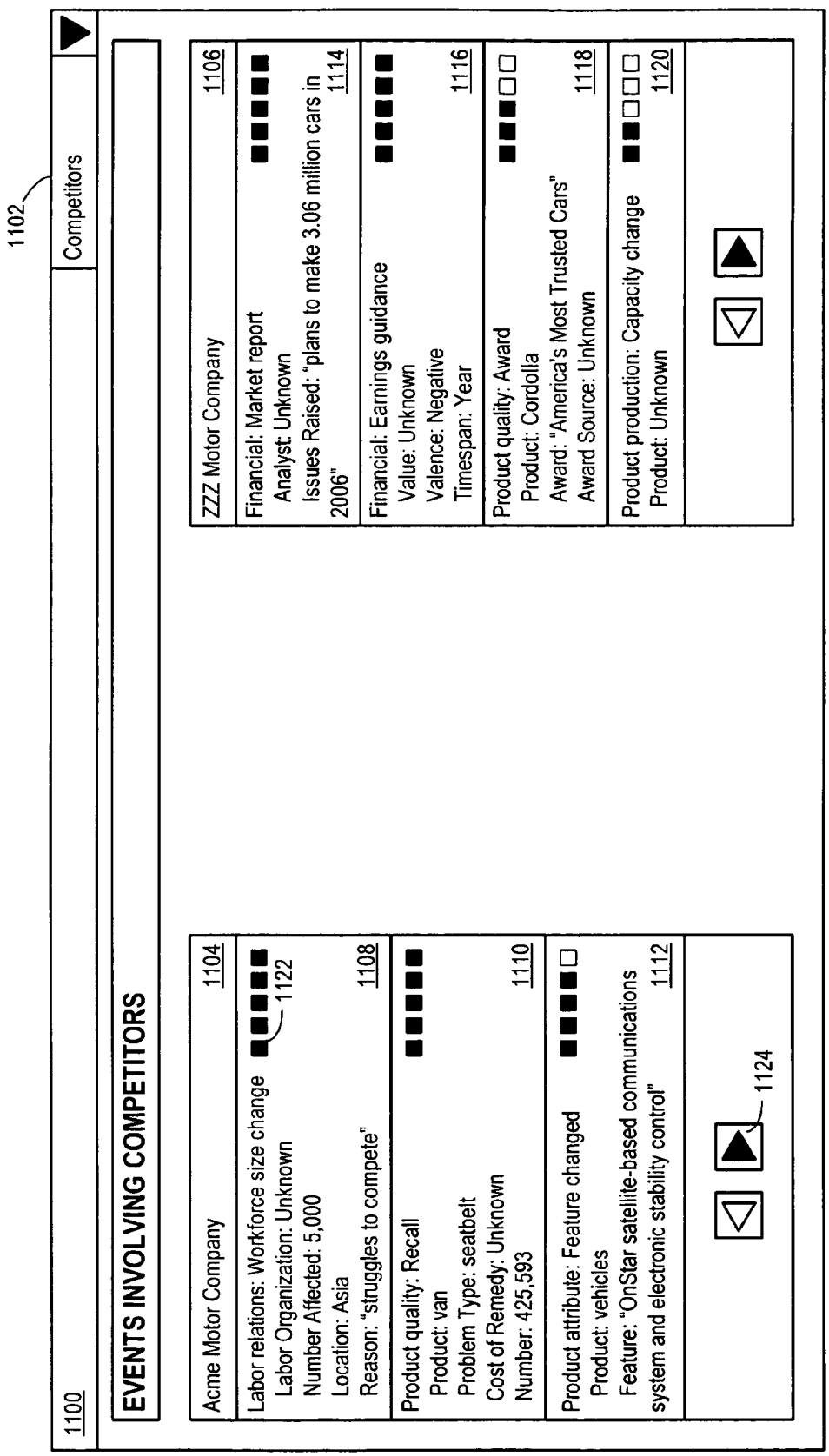
FIG. 11 shows a competitor display rendered on a user interface.

Given the display files or database entries, the event analysis system 100 renders the events on the user interface 142. FIG. 11 shows an example of a competitor display 1100 rendered on the user interface 142. The event analysis system 100 may display one or more events associated with a particular entity, events of a particular type, events within a specific date range, events obeying a particular relationship, or any other set of events. The event analysis system 100 may read a configuration file of operator preferences to determine how many events to display, what date ranges to display, or to determine any other display parameter (including, as examples, color, font size, and data position on the display).

The system 100 may also accept input from the operator to select and modify one or more of these parameters.

The user interface 142 includes a display selector 1102, through which an operator may select the information which will be shown on the user interface 142. As shown in FIG. 11, the display selector is set to Competitors. The event analysis system 100 responds to the display selector 1102 by responsively updating the display to show the requested information, such as events involving all Competitors, Products, Suppliers (or specific individual Competitors, Products, or Suppliers), or any other relationship defined in the environment model 130.

In particular the competitor display 1100 includes the Acme competitor event window 1104 and the ZZZ Motor Company competitor event window 1106. Additional competitor event windows may be displayed, one for each competitor defined in the environment model 130 with regard to the current focus. The Acme competitor event window 1104 includes three event panes 1108, 1110, and 1112. The ZZZ competitor event window 1106 includes four event panes 1114, 1116, 1118, and 1120.

Each event pane 1114-1120 displays the data for an event involving a particular competitor entity as detected by the event analysis system. In addition, each event pane may display an importance indicator. As an example, the importance indicator 1122 shows that the layoffs at Acme motor company have been assigned a level 5 importance. Navigation buttons 1124 (in this case arrow buttons) allow the operator to move between multiple pages of event panes.

The user interface 142 may also provide drill down links. For example, any of the event panes 1108-1120 may operate as a drill down link when clicked. In response, the user interface 142 may display an event detail window.

FIG. 12 shows an example of an event detail window 1200 for the Acme layoff event. The event detail window 1200 includes an overview pane 1202, a buzz analysis pane 1204, and a potential implications pane 1206. The event detail window 1200 also includes a sources pane 1208 and a source text pane 1210. The event detail window 1200 may vary widely in content, however, and is not limited to the form shown in FIG. 12.

The overview pane 1202 specifies the event type, event importance, and event attributes for the event. The operator may change any of the entries in the overview pane 1202 using the Edit/Confirm/Cancel interface buttons 1212. When editing the entries, the user interface 142 may provide text entry fields, drop down selection menus, selection buttons, or any other user interface element which accepts modified event data. Any modifications may feed back into the analysis engines 134, and initiate a revised analysis (e.g., a revised implication analysis) based on the modified information.

The buzz analysis pane 1204 displays the public interest level with regard to the event. As noted above, the buzz and sentiment engine 140 may gauge the public interest level. Alternatively, the event analysis system 100 may obtain the buzz and sentiment level from external measurement systems.

The sources pane 1208 displays the article title and the article source. In the example shown in FIG. 12, the article title is "Acme slashing production and jobs." The information source 116 from which the article was retrieved is identified as ABC Newspaper. The source pane 1208 may include a drop down menu from which the operator may select from multiple sources reporting the same event. The source text window 1210 displays the text of the article received from the information source 116, while the source link button 1212 provides a mechanism by which the event reporting system 100 may open and display the original article from the original information source (e.g., by opening a web page addressed to the link at which the article is found).

The event analysis system 100 may interact with or provide graphical tools 150 for building any of the models described above. For example, a graphical tool to build the environment model 130 may provide a focus selector, an entity relationship selector (e.g., to choose between Competitor, Consumers, and Products relationships), and a selection pane of entity types (e.g., organizations, brands, or product types) to add to the selected entity relationship. The environment model tool may also provide a pane with interface elements which display and/or accept input to set the attributes of the entities, such as displayed name, full name, ID, identifiers, OneSourceID, and other attributes.

Figure 13:
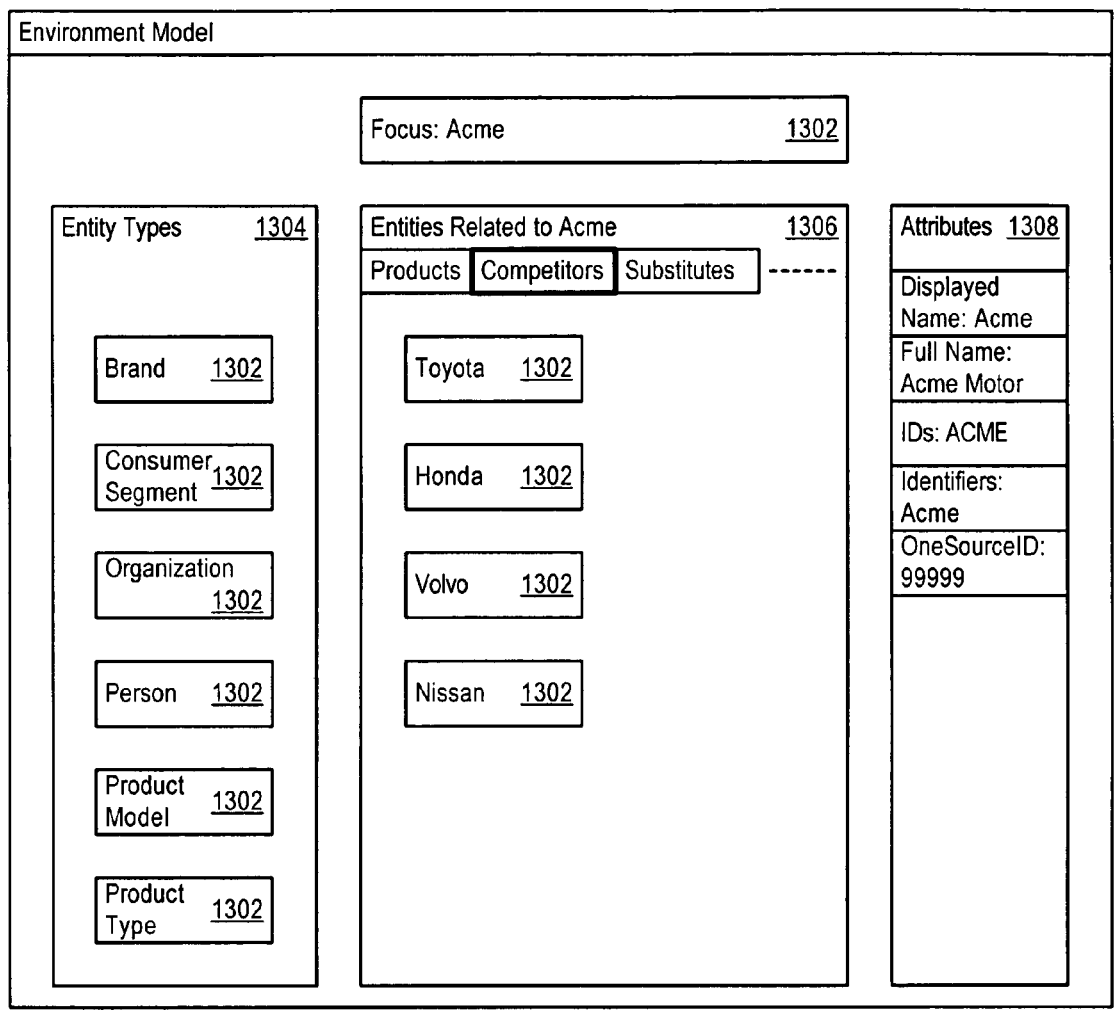
FIG. 13 shows a graphical user interface front end to an environment model design tool.

FIG. 13 shows one example of a graphical user interface front end 1300 to an environment model tool. The front end 1300 shows a focus selector 1302, an entity type pane 1304, and an entity type selection pane 1306. The attributes pane 1308 displays and accepts input to set specific attributes of the entities.

Similarly, an event model tool may provide a tree node editing pane in which the operator may add or delete leaf and non-leaf event nodes. The event model tool may also provide a pane which displays and accepts input which defines or modifies event type properties, including colors, parent and/or child nodes, event attributes, regular expressions, weights, and any other characteristic of an event.

FIG. 14 shows an example of a graphical user interface front end 1400 to an event model tool. The front end 1400 includes a node editing pane 1402 for adding, modifying, and deleting nodes in the event model 128. The front end 1400 also includes an event properties pane 1404 which displays the properties assigned to an event type. In addition, an event type editing pane 1406 displays and accepts operator input to set, change, or delete regular expressions and weights assigned to the regular expressions.

An implication model tool provides a graphical mechanism for an operator to define and modify elements of the event implication model 132. To that end, the implication model tool may provide a window in which new threat and opportunity items (i.e., trigger events) are established. To that end, the implication model tool accepts operator input for selecting, defining, or modifying a trigger constraint (e.g., a New position trigger type), one or more attribute constraints (e.g., a Match or Non-Empty constraint), and attribute constraint properties, including the values which will satisfy the constraint. Furthermore, the implication model tool may accept operator input to select a corresponding resulting implication, as well as define the implication messages and events. In addition, the implication model tool also provides a selection interface for assigning trigger events to specific events defined in the event model 128.

FIG. 15 shows an example of the graphical user interface front end 1500, including an implication model window 1502 and a threat/opportunity editing window 1504. The implication model window 1502 displays events and implication rules defined for the events. The editing window 1504 displays the implication rules, and allows the operator to add, change, or delete trigger constraints 502 and resulting implications 504.

Similarly, a graphical user interface may be provided for accepting, modifying, and deleting information which establishes the information source model 126. To that end, the system 100 may provide input interface elements for accepting an information source name, url (or other locator or specifier), a connection method (e.g., RSS, FTP, HTTP), an update frequency, a reputation level, or any other information which the operator desires to add to characterize the information source.

Each of the modeling tools 150 separates the user from the underlying XML code in the models 126-132. The modeling tools 150 convert from the graphical elements to corresponding entries in XML statements which compose the models 126-132. For example, when an operator ads the "XYZ Motor" element to the competitors list for Acme motors, the modeling tool may insert a new organization ID tag into the Competitors list for Acme in the environment model 130. Accordingly, the operator is not burdened with writing XML to define, modify, and change the models.

The event analysis system 100 solves several challenging technical problems surrounding event detection and implication. The fundamental problem is to automatically detect and relate to users information about external events. One associated problem was to determine how to design models which facilitate event detection and implication. Thus, for example, the environment model 130 stores descriptions of entities that make up the competitive ecosystem for a particular industry, as well as relationships between those entities. In order to filter out events that do not reference any entities in the model, the system 100 attaches key phrases to the entities in the model. The system 100 may thereby detect when an article mentions an entity which is relevant to the operator. The relationships stored in the model help the system infer how certain events may affect particular entities, based on the location of the entities in the business ecosystem. Furthermore, the environment model 130 helps the user interface 142 display events in an organized manner.

Additionally, the event model 128 was built to store descriptions of the event types which the system 100 will detect and process. Each description includes key phrases through which the system 100 detects instances of that event type (in other words, classify input data as belonging to a specific event type). In addition, the event model 128 instructs the system 100 about which key pieces of information (attributes) to extract from instances of that event type. The event model 128 also provides a structure for the inference rules applied by the implication engine, and includes information on how to display each event in the user interface 142.

In addition, the event implication model 132 stores interpretive rules which the system 100 applies to determine what future events may occur based on existing events. Each rule in the model may specify which event type and attribute values should match in order for the implication engine to generate an implied event from an existing detected event. Finally, the information source model 126 stores descriptions of online data sources. The information source model 126 specifies how the system collects information from the data sources and how to resolve conflicting data pulled from the data sources.

Another problem was viewing and maintaining the models. The modeling tools described above allow the operator to view and maintain the models in a way that does not presuppose any understanding of XML or XML-editing tools. To that end, the modeling tools provide a custom display for each of the models, and provide a rich graphical user interface through which the operators may view, add, delete, or edit entries in each of the models. The modeling tool converts the graphical elements to well-formed XML that conforms to the appropriate schemas for the models. Accordingly, the modeling tools generate XML which the system 100 may parse without requiring manual coding.

Another technical challenge was providing a client-specific event processing application driven by the models. The technical challenge was addressed by breaking the event processing into several distinct steps. First, the system 100 consults the information source model 126 to determine from which online sources to obtain articles. This articles are augmented with information about the source itself, such as source reliability or source importance, and then converted into a standard format to be consumed by the application's processing engines. Next, the system 100 applies the environment model 130 to filter out content which is not of interest, according to the particular industry focus for the particular system implementation.

After the input data stream has been filtered, the system 100 uses the event model 128 to drive the classification of the data. The result is a classification into an event type. The event model 128 includes a list of possible event types and representative text phrases to aid in the classification process. The event model 128 also drives extraction of attribute information for each event. To that end, the event model 128 includes a list of particular attributes to extract for each event type and representative text patterns to aid in the extraction process. The system 100 may then apply the event implication model 132 to drive the inference of new potential events from existing events. In the implication engine, each inference rule contained in the model is applied to each input event to find matches. A match results in an implied event. As described above, the event display preparation engine 146 then creates output XML files which drive the user interface 142 to report the events.

It is therefore intended that the foregoing detailed description be regarded as illustrative rather than limiting, and that it be understood that it is the following claims, including all equivalents, that are intended to define the spirit and scope of this invention.

The invention claimed is:

1. An event analysis system comprising:
    a network interface;
    an information database comprising articles received through the network interface from a first information source;
    a memory comprising:
        an event model comprising an event type and event attributes of the event type;
        an event detection engine;
        an event implication engine;
        an environment model comprising a first model entity and a focus entity, and a focus relationship from the focus entity to the first model entity; and
    a processor coupled to the memory and the network interface which is operable to:
        receive the articles;
        initiate execution of the event detection engine on the articles to detect an event involving the first model entity represented in the articles and apply the event model to generate an event object according to a common event structure which is independent of the first information source;
        initiate execution of the event implication engine on the event object to determine an inferred event on behalf of the focus entity in view of the focus relationship; and
        generate a display of the event and the inferred event:
    where the event implication engine recognizes that the focus relationship exists between the focus entity and the first model entity and responsively generates the inferred event due to detection of the event involving the first model entity, and creates a new event object from the inferred event;

where the event object comprises: an event type field: an event type probability field; an importance field; and a public interest field;

where the network interface receives a public interest level value and importance level value of the event; and where the event detection engine is configured to:
store an event type value in the event type field that indicates an event type;
store an event type probability field value in the probability field that indicates the probably that the event type has occurred;
store the importance level value in the importance field that indicates the importance level of the event; and
store the public interest level value in the public interest field that indicates the level of interest of the public in the event.

2. The event analysis system of claim 1, where the event detection engine is further configured to:
determine whether any entities in the environment model are associated with the event; and
discard the event when no entity in the environment model is associated with the event.

3. The event analysis system of claim 1, where the memory further comprises:
an event implication model comprising a trigger constraint and a resulting implication, and where the event implication engine applies the event implication model to determine the resulting implication.

4. The event analysis system of claim 1, where the processor is further operable to:
apply the event implication engine to the new event object.

5. The event analysis system of claim 1, where the information database further comprises:
an information source model that comprises reputation, reliability and quality characteristics of the first information source;
additional articles from a second information source; and
where the information source model further specifies the second information source, including reputation, reliability and quality characteristics of the second information source; and
where the event detection engine is further operable to:
resolve conflicts between data obtained from the first information source and the second information source by analyzing the reputation, reliability and quality characteristics in the information source model.

6. The event analysis system of claim 1, further comprising:
an event database which stores the event object.

7. The event analysis system of claim 2, where the event detection engine is operable to:
apply a filter to determine whether the event object specifies an entity in the environment model.

8. The event analysis system of claim 7, where the event detection engine is further operable to:
apply a classification algorithm to the event object to determine the event type represented in the event object.

9. The event analysis system of claim 8, where the event detection engine is further operable to:
extract attributes specific to the event type from article text in the event object; and
store the attributes into attribute fields of the event object.

10. The event analysis system of claim 9, where the event object includes an event description, and where the event detection engine is operable to:
tokenize the event description to provide a tokenized description; and
tag tokens in the tokenized description with parts-of-speech to provide a tagged description.

11. The event analysis system of claim 10 where the event detection engine is further operable to:
perform named entity recognition on the tagged description;
parse the tagged description to identify grammatical structure; and
perform template matching to determine event attribute values for the event type.

12. The event analysis system of claim 1, where the memory further comprises an event modeling tool operable to display a user interface for modifying the event model.

13. The event analysis system of claim 2, where the memory further comprises an environment modeling tool operable to display a user interface for modifying the environment model.

14. The event analysis system of claim 3, where the memory further comprises an implication modeling tool operable to display a user interface for modifying the event implication model.

15. A computer implemented method for event analysis comprising:
reading from a computer readable memory an information source model to determine an information source;
retrieving an article from the information source;
reading from a computer readable memory an environment model comprising a first model entity and a focus entity, and a focus relationship from the focus entity to the first model entity;
initiating, with a processor coupled to the computer readable memory, execution of an event detection engine on the article to detect an event involving the first model entity represented in the article which is relevant to the focus entity based on the focus relationship and generate an event object comprising: an event type field; an event type probability field; an importance field; and a public interest field;
reading from a computer readable memory an event implication model;
initiating execution, with a processor, of an event implication engine on the event object to determine an inferred event on behalf of the focus entity in view of the focus relationship and an implication message which are relevant to the focus entity;
recognizing that the focus relationship exists between the focus entity and the first model entity and responsively generating the inferred event due to detection of the event involving the first model entity; and
creating a new event object from the inferred event.

16. The method of claim 15, where reading an event implication model comprises:
reading a trigger constraint and a resulting implication.

17. The method of claim 16, where reading a trigger constraint comprises: reading an event constraint and an attribute constraint on the event constraint.

18. The method of claim 15, further comprising:
storing the new event object in an event database; and
initiating execution of the event implication engine on the new event object.

19. The method of claim 15, further comprising:
determining an event type based on the article;
creating the event object of the event type, including an event description from the article; and
storing the event object in an event database.

20. The method of claim 19, where initiating execution of the event detection engine comprises:

initiating execution of a tokenizer on the event description to generate a tokenized description; and tagging tokens in the tokenized description to provide a tagged description.

21. The method of claim 20, further comprising:

performing named entity recognition on the tagged description; and performing template matching to determine event attribute values for the event type.

22. The method of claim 19, further comprising:

applying a classification algorithm to the event object to determine the event type represented in the event object.

23. The method of claim 22, further comprising:

reading an event model to determine event attributes for the event type; and extracting values for the event attributes from the event object.

24. An event analysis system comprising:

a network interface;

an information database;

an event database;

a memory comprising:
    an information source model;
    an environment model which defines a first model entity and a focus entity;
    an event model which defines events;
    an event implication model and an event detection engine;
    an event implication engine; and
    an event processing control program comprising instructions which:
        read the information source model to determine information sources;
        retrieve articles from the information sources and store the articles in the information database;
        initiate execution of the event detection engine on the articles to detect events represented in the articles, generate event objects according to a common event structure which is independent of the information sources, and store the event objects in the event database;
        initiate execution of the event implication engine on the event objects to determine an inferred event on behalf of the focus entity in view of a focus relationship, where the event implication engine recognizes that the focus relationship exists between the focus entity and the first model entity and responsively generates the inferred event due to detection of the event involving the first model entity, generate a new event object from the inferred event, and store the new event object in the event database; and initiate communication of the event objects including the inferred event to an external system subscribed to the event analysis system;

re-initiate execution of the event implication engine on the new event Object, generate an additional event object, and store the additional event object in the event database; and receive a public interest level value and importance level value for each event, where the event model comprises an event type and event attributes of the event type, and where the new event object and the additional event object each comprise: an event type field; an event type probability field; an importance field; and a public interest field;

a processor coupled to the memory and operable to execute the instructions of the event processing control program.

25. The event analysis system of claim 24, where the instructions which initiate communication comprise:

instructions which publish the event object to a message subscription/ publication service.

26. The event analysis system of claim 24, where the event implication model comprises a trigger constraint and a resulting implications.

27. The event analysis system of claim 26, where the trigger constraint comprises an event constraint and an attribute constraint on the event constraint.

28. The event analysis system of claim 24, where the environment model comprises the focus relationship specifying a relationship between the focus entity and the first model entity.

29. The event analysis system of claim 28, where the event detection engine is further operable to:

determine event entities including the first model entity associated with the events; and filter the events based on presence of the focus entity in the focus relationship.

* * * * *

UNITED STATES PATENT AND TRADEMARK OFFICE
CERTIFICATE OF CORRECTION

PATENT NO. : 7,523,137 B2
APPLICATION NO. : 11/387173
DATED : April 21, 2009
INVENTOR(S) : Alex Kass et al.

It is certified that error appears in the above-identified patent and that said Letters Patent is hereby corrected as shown below:

On the Title Page

Page 2, column 2, line 4, before "Advanced, Inxight" delete "ThingFlnder®" and substitute --ThingFinder®-- in its place.

In the Specification

In column 5, line 14, delete "and/or or graphical" and substitute --and/or graphical-- in its place.

In column 9, about line 42, before "about the analysis" delete "is are" and substitute --is-- in its place.

In column 9, about line 65, delete "the postRegex field" and substitute --the "postRegex" field-- in its place.

In column 10, about line 29, after "example of" delete "a 'hire' event" and substitute --a 'Hire' event-- in its place.

In column 11, about line 38, after "does not describe" delete "a 'hire' event" and substitute --a 'Hire' event-- in its place.

In column 11, about line 41, after "Note that" delete "the 'hire' event" and substitute --the 'Hire' event-- in its place.

In column 13, about line 34, after "children of the" delete "organization-centered" and substitute --Organization-centered-- in its place.

In column 19, about lines 20-21, before "Brand entity," delete "an" and substitute --a-- in its place.

In column 19, about line 21, after "contains the definition of" delete "an" and substitute --a-- in its place.

UNITED STATES PATENT AND TRADEMARK OFFICE
CERTIFICATE OF CORRECTION

PATENT NO. : 7,523,137 B2
APPLICATION NO. : 11/387173
DATED : April 21, 2009
INVENTOR(S) : Alex Kass et al.

It is certified that error appears in the above-identified patent and that said Letters Patent is hereby corrected as shown below:

In column 19, about line 25, before "Person entity." delete "an" and substitute --a-- in its place.

In column 27, line 45, delete "(At 816)" and substitute --(Act 816)-- in its place.

In column 36, line 4, before "articles are" delete "This" and substitute --These-- in its place.

In column 37, claim 1, line 1, immediately after "an event type field" delete ":" and substitute --;-- in its place.

Signed and Sealed this

Third Day of November, 2009

David J. Kappos
*Director of the United States Patent and Trademark Office*